US011914757B2

(12) United States Patent
Rao

(10) Patent No.: US 11,914,757 B2
(45) Date of Patent: Feb. 27, 2024

(54) ACCELERATED CRYPTOGRAPHIC-RELATED PROCESSING

(71) Applicant: INTERNATIONAL BUSINESS MACHINES CORPORATION, Armonk, NY (US)

(72) Inventor: Rajat Rao, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 309 days.

(21) Appl. No.: 17/370,038

(22) Filed: Jul. 8, 2021

(65) Prior Publication Data
US 2023/0025869 A1   Jan. 26, 2023

(51) Int. Cl.
G06F 21/72     (2013.01)
G06F 21/60     (2013.01)

(52) U.S. Cl.
CPC ............ *G06F 21/72* (2013.01); *G06F 21/602* (2013.01)

(58) Field of Classification Search
CPC .............................. G06F 21/72; G06F 21/602
See application file for complete search history.

(56) References Cited

U.S. PATENT DOCUMENTS

| 4,945,548 | A | * | 7/1990 | Iannarone | ................. G06F 5/14 370/506 |
| 2017/0147835 | A1 | | 5/2017 | Bacon et al. | |
| 2018/0097625 | A1 | | 4/2018 | Satpathy et al. | |
| 2019/0156051 | A1 | | 5/2019 | Beier et al. | |
| 2019/0312728 | A1 | | 10/2019 | Poeppelmann | |
| 2019/0319797 | A1 | | 10/2019 | Suresh et al. | |
| 2019/0319804 | A1 | | 10/2019 | Mathew et al. | |
| 2020/0265167 | A1 | | 8/2020 | Banerjee et al. | |
| 2021/0019261 | A1 | * | 1/2021 | Tsirkin | ................. G06F 9/45545 |
| 2021/0119766 | A1 | * | 4/2021 | Suresh | .................... G06F 7/552 |

OTHER PUBLICATIONS

Mel et al., "The NIST Definition of Cloud Computing," National Institute of Standards and Technology, Information Technology Laboratory, Special Publication 800-145, Sep. 2011 (pp. 1-7).
Fan et al., "Somewhat Practical Hully Homomorphic Encryption", IACR Cryptol., ePrint Arch. (Year: 2012) (19 pages).
IBM Publication, "z/Architecture Principles of Operation," IBM® Publication No. SA22-7832-12, 13th Edition, Sep. 2019 (pp. 1-2000).

(Continued)

*Primary Examiner* — Ayoub Alata
(74) *Attorney, Agent, or Firm* — Edward J. Wixted, III, Esq.; Kevin P. Radigan, Esq.; Heslin Rothenberg Farley & Mesiti P.C.

(57) ABSTRACT

Cryptographic-related processing is facilitated by obtaining multiple input operands, and packing the multiple input operands together to form a packed integer. The packed integer is an n-bit integer including multiple slots, where input operands of the multiple input operands are packed into every other slot of the multiple slots, and each slot of the multiple slots has a bitwidth k. Further, the process includes providing the packed integer as input to an n-bit accelerator to facilitate performing one or more predefined operations using the packed integer, to transform the packed integer into result data which facilitates cryptographic-related processing.

20 Claims, 16 Drawing Sheets

(56) References Cited

OTHER PUBLICATIONS

Seiler, Gregor, "Faster AVX2 Optimized NTT Multiplication for Ring-LWE Lattice Cyptography", downloaded from: https://crypto.ethz.ch/publications/files/Seiler18.pdf (Year:2020) (14 pages).
International Search Report (ISR) & Written Opinion for PCT/CN2022/099133, dated Aug. 26, 2022 (9 pages) (Year: 2022).

\* cited by examiner

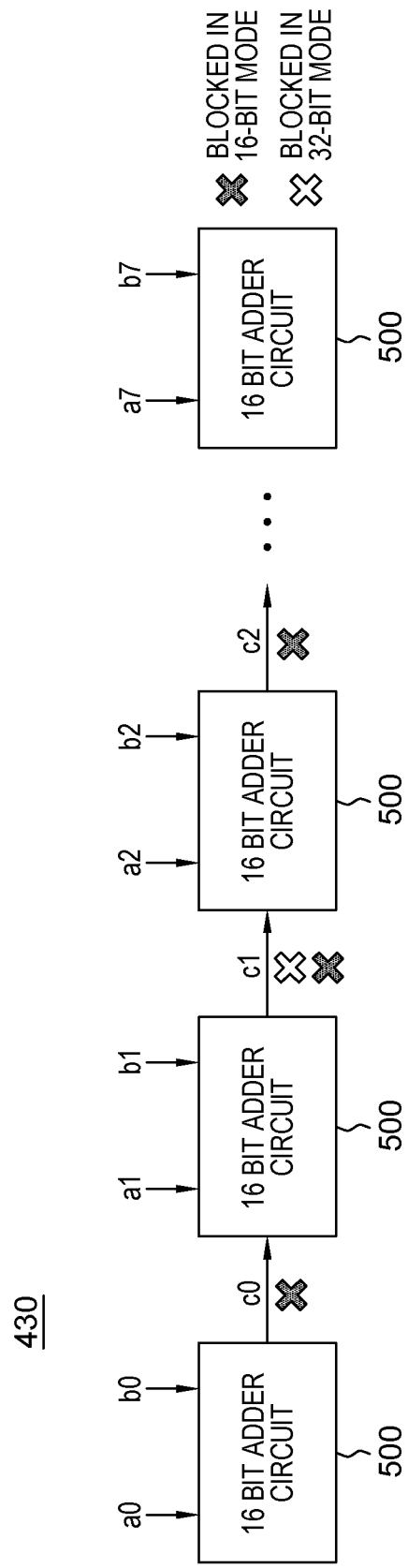

OBTAIN MULTIPLE INPUT OPERANDS ~700

PACK THE MULTIPLE INPUT OPERANDS TOGETHER TO FORM A PACKED INTEGER, THE PACKED INTEGER BEING AN N-BIT INTEGER INCLUDING MULTIPLE SLOTS, WHERE INPUT OPERANDS OF THE MULTIPLE INPUT OPERANDS ARE PACKED INTO EVERY OTHER SLOT OF THE MULTIPLE SLOTS, AND EACH SLOT OF THE MULTIPLE SLOTS HAS A BITWIDTH K ~702

PROVIDE THE PACKED INTEGER TO AN N-BIT ACCELERATOR TO FACILITATE PERFORMING ONE OR MORE PREDEFINED OPERATIONS USING THE PACKED INTEGER, TO TRANSFORM THE PACKED INTEGER INTO RESULT DATA WHICH FACILITATES CRYPTOGRAPHIC-RELATED PROCESSING ~704

PERFORM, BY THE N-BIT ACCELERATOR, AN ARITHMETIC OPERATION USING THE INPUT OPERANDS PACKED IN THE PACKED INTEGER TO OBTAIN AN INTERMEDIATE RESULT COMPRISING MULTIPLE RESULT COMPONENTS ~706

SHUFFLE AND REPACK THE INTERMEDIATE RESULT TO OBTAIN A LOW-PART PACKED INTEGER AND A HIGH-PART PACKED INTEGER, THE LOW-PART PACKED INTEGER BEING A RESPECTIVE N-BIT INTEGER INCLUDING MULTIPLE SLOTS, WHERE LOW-ORDER PARTS OF THE INTERMEDIATE RESULT ARE PACKED INTO EVERY OTHER SLOT OF THE MULTIPLE SLOTS, WITH EACH LOW-ORDER PART BEING K-BITS WIDE, STARTING FROM A LEAST-SIGNIFICANT BIT OF A RESPECTIVE RESULT COMPONENT OF THE INTERMEDIATE RESULT, AND THE HIGH-PART PACKED INTEGER BEING A RESPECTIVE N-BIT INTEGER INCLUDING MULTIPLE SLOTS, WHERE HIGH-ORDER PARTS OF THE INTERMEDIATE RESULT ARE PACKED INTO EVERY OTHER SLOT OF THE MULTIPLE SLOTS, WITH EACH HIGH-ORDER PART BEING K-BITS WIDE, STARTING FROM A MOST-SIGNIFICANT BIT OF THE RESPECTIVE RESULT COMPONENT OF THE INTERMEDIATE RESULT ~708

FURTHER SEPARATELY USING THE LOW-PART PACKED INTEGER AND THE HIGH-PART PACKED INTEGER IN FACILITATING OBTAINING THE RESULT DATA WHICH FACILITATES THE CRYPTOGRAPHIC-RELATED PROCESSING ~710

FIG. 7A

PERFORM, BY THE N-BIT ACCELERATOR, ANOTHER ARITHMETIC OPERATION USING THE HIGH-PART PACKED INTEGER AND A PREDETERMINED CONSTANT U, THE PREDETERMINED CONSTANT U BEING DEPENDENT, IN PART, ON THE BITWIDTH K, WHERE PERFORMING THE OTHER ARITHMETIC OPERATION GENERATES ANOTHER INTERMEDIATE RESULT INCLUDING MULTIPLE RESULT COMPONENTS ~712

SHUFFLE AND REPACK THE OTHER INTERMEDIATE RESULT TO OBTAIN ANOTHER HIGH-PART PACKED INTEGER, THE OTHER HIGH-PART PACKED INTEGER BEING ANOTHER N-BIT INTEGER INCLUDING MULTIPLE SLOTS, WHERE HIGH-ORDER PARTS OF THE MULTIPLE RESULT COMPONENTS OF THE OTHER INTERMEDIATE RESULT ARE PACKED INTO EVERY OTHER SLOT OF THE MULTIPLE SLOTS ~714

USE THE OTHER HIGH-PART PACKED INTEGER IN FACILITATING OBTAINING THE RESULT DATA WHICH FACILITATES THE CRYPTOGRAPHIC-RELATED PROCESSING
716

PERFORM A FURTHER ARITHMETIC OPERATION USING THE OTHER HIGH-PART PACKED INTEGER AND A PREDEFINED PRIME VALUE TO OBTAIN A FURTHER INTERMEDIATE RESULT INCLUDING MULTIPLE RESULT COMPONENTS ~718

SHUFFLE AND REPACK THE FURTHER INTERMEDIATE RESULT TO OBTAIN A FURTHER LOW-PART PACKED INTEGER, THE FURTHER LOW-PART PACKED INTEGER BEING A FURTHER N-BIT INTEGER INCLUDING MULTIPLE SLOTS, WHERE LOW-ORDER PARTS OF THE MULTIPLE RESULT COMPONENTS OF THE FURTHER INTERMEDIATE RESULT ARE PACKED INTO EVERY OTHER SLOT OF THE MULTIPLE SLOTS ~720

USE THE FURTHER LOW-PART PACKED INTEGER IN FACILITATING OBTAINING THE RESULT DATA WHICH FACILITATES THE CRYPTOGRAPHIC-RELATED PROCESSING
722

FURTHER PERFORM ONE OR MORE CORRECTION OPERATIONS USING, AT LEAST IN PART, THE LOW-PART PACKED INTEGER TO OBTAIN THE RESULT DATA ~724

WHERE THE PACKING FURTHER INCLUDES PROVIDING A NULL VALUE OF BITWIDTH K IN A SLOT OF THE MULTIPLE SLOTS LOCATED BETWEEN TWO INPUT OPERANDS OF THE MULTIPLE INPUT OPERANDS PACKED INTO EVERY OTHER SLOT OF THE MULTIPLE SLOTS ~726

WHERE THE RESULT DATA FACILITATES LATTICE-BASED CRYPTOGRAPHIC PROCESSING, AND THE N-BIT ACCELERATOR INCLUDES A MODULAR ARITHMETIC, HARDWARE ACCELERATOR UNIT ~728

WHERE THE BITWIDTH K OF THE MULTIPLE SLOTS INCLUDES ONE OF 16-BITS OR 32-BITS ~730

FIG. 7B

ACCELERATED CRYPTOGRAPHIC-RELATED PROCESSING

BACKGROUND

One or more aspects relate, in general, to facilitating processing within a computing environment, and in particular, to facilitating cryptographic-related processing within a computing environment. Cryptography systems can be used in a variety of computing environments to facilitate communicating securely between entities of the environment.

Computing environments can include different types of processors to enhance processing. As an example, a computing environment can include one or more central processing units (CPUs), which are considered main processors, and one or more adjunct processors that are considered subordinate to the CPUs. An adjunct processor typically performs specific types of tasks. For instance, a particular example of an adjunct processor is a cryptographic (crypto) card used to perform cryptographic operations.

SUMMARY

Certain shortcomings of the prior art are overcome and additional advantages are provided through the provision, in one or more aspects, of a computer system for facilitating cryptographic-related processing within a computing environment. The computer system includes a memory, and a processing circuit in communication with the memory, where the computer system is configured to perform a method, which includes obtaining multiple input operands, and packing the multiple input operands together to form a packed integer. The packed integer is an n-bit integer including multiple slots, where input operands of the multiple input operands are packed into every other slot of the multiple slots, and each slot of the multiple slots has a bitwidth k. Further, the method includes providing the packed integer to an n-bit accelerator to facilitate performing one or more predefined operations using the packed integer, to transform the packed integer into result data which facilitates cryptographic-related processing.

Computer-implemented methods and computer program products relating to one or more aspects are also described and claimed herein. Further, services relating to one or more aspects are also described and can be claimed herein.

Additional features and advantages are realized through the techniques described herein. Other embodiments and aspects of the invention are described in detail herein and are considered a part of the claimed aspects.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 5 depicts one technical implementation of a correction circuit embodiment for a cryptographic-related processing implementation such as depicted in FIG. 4, in accordance with one or more aspects of the present invention;

FIGS. 7A-7B depict one embodiment of aspects related to facilitating processing within a computing environment, in accordance with one or more aspects of the present invention;

DETAILED DESCRIPTION

Figure 1A:
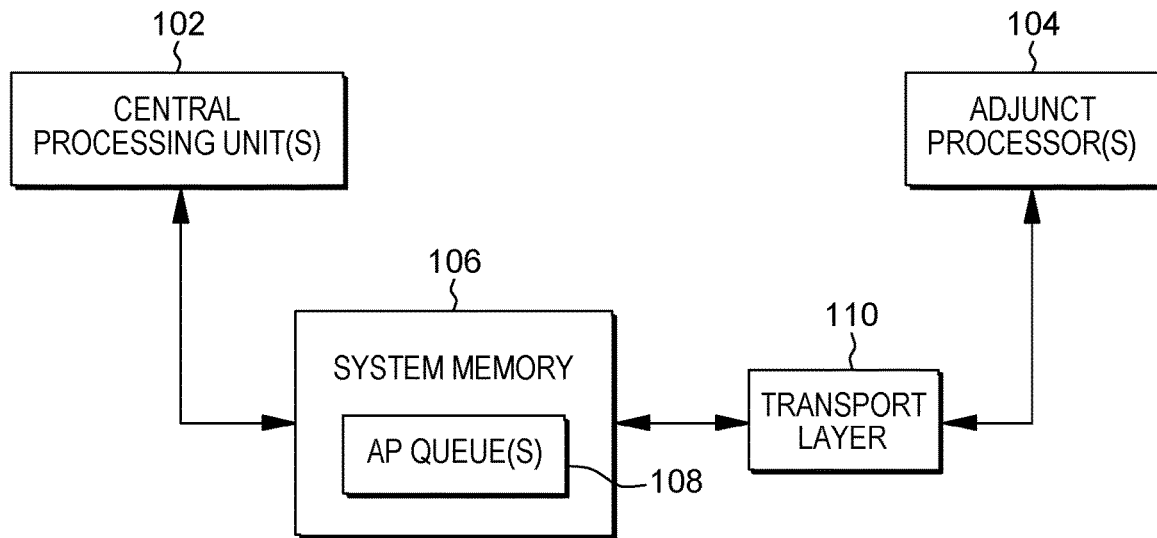
FIG. 1A depicts one embodiment of a computing environment to incorporate and use one or more aspects of the present invention.

The accompanying figures, in which like reference numerals refer to identical or functionally similar elements throughout the separate views, and which are incorporated in and form a part of this specification, further illustrate the present invention and, together with the detailed description of the invention, serve to explain aspects of the present invention. Note in this regard that descriptions of well-known systems, devices, cryptosystems, processing techniques, etc., are omitted so as to not unnecessarily obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application of the concepts disclosed herein.

Note also that illustrative embodiments are described below using specific code, designs, architectures, cryptosystems, protocols, layouts, schematics or tools, only as examples, and not by way of limitation. Further, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

Figure 8A:
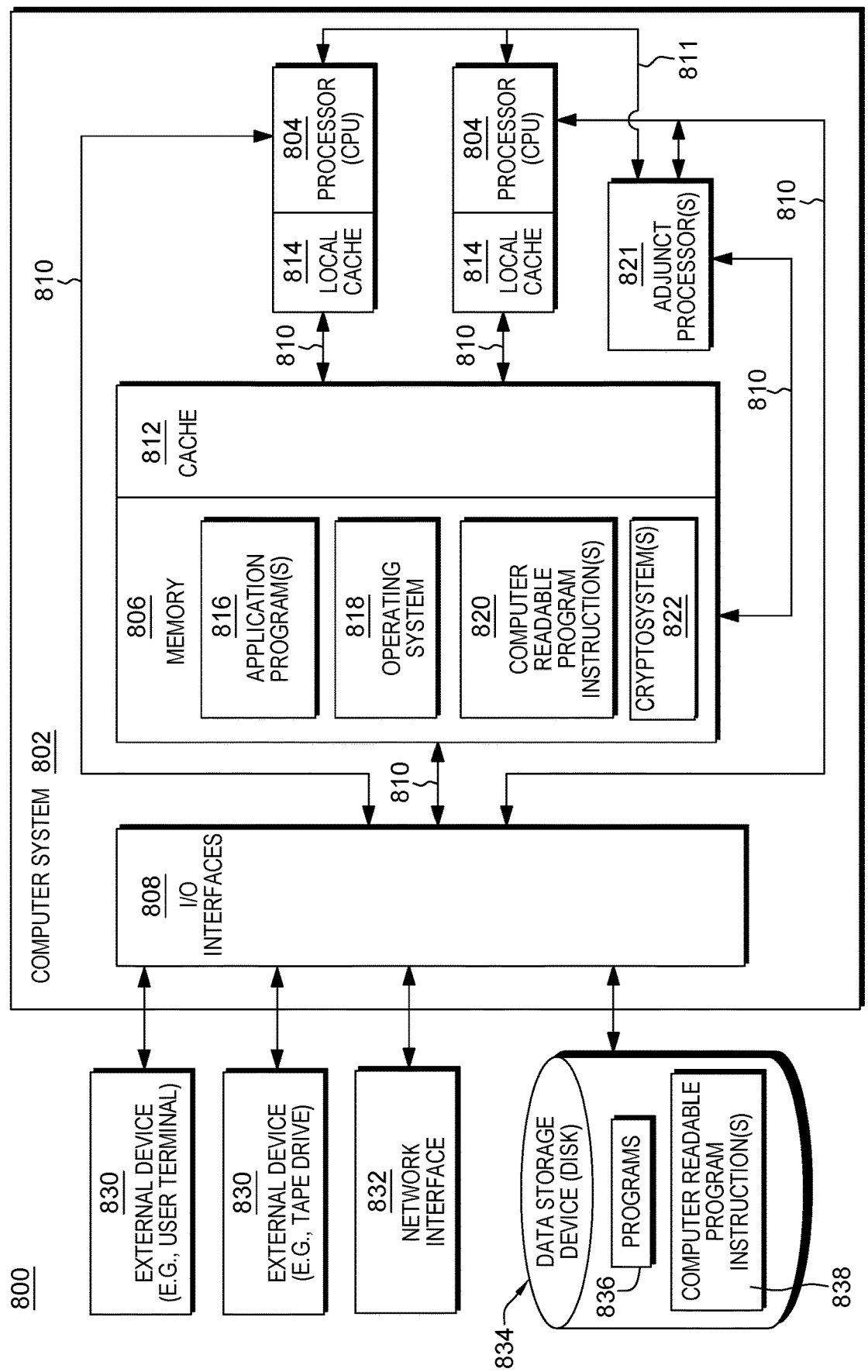
FIG. 8A depicts one example of a computing environment to incorporate and use one or more aspects of the present invention.

As understood by one skilled in the art, program code, as referred to in this application, can include both hardware and software. For example, program code in certain embodiments of the present invention can include fixed function hardware, but other embodiments can utilize a software-based implementation of the functionality described. Certain embodiments combine both types of program code. One example of program code, also referred to as one or more programs or program instructions, is depicted in FIG. 8A as one or more of application program(s) 816, computer-readable program instruction(s) 820, and/or cryptosystem(s) 822, stored in memory 806 of computer system 802, as well as programs 836 and computer-readable program instruction(s) 838, stored in a data storage device 834 accessed by computer system 802. In one or more other embodiments, the program code can be fixed function hardware implemented within one or more accelerators or adjunct processors 821 of computer system 802.

As noted, cryptography systems can be used in a variety of computing environments to facilitate secure communication. In one or more embodiments, a cryptography system (or cryptosystem) provides a security certificate, or digital certificate, to facilitate the secure communication, such as within a computing system or between computing systems.

More particularly, cryptography is an essential tool in secure processing. When an application must communicate with other distributed elements, or assert or ascertain the validity of data that is being processed, cryptography is typically used. As noted, in one or more embodiments, computing environments can include different types of processors to enhance processing. As an example, a computing environment can include one or more central processing units (CPUs), which are considered main processors, and one or more adjunct processors, which are considered subordinate to the CPUs. An adjunct processors typically performs specific types of tasks. For instance, a particular type of adjunct processor is a cryptographic (crypto) card used to perform cryptographic operations.

An example of a cryptographic card, offered by International Business Machines Corporation, Armonk, New York (USA), is a IBM® 4769 PCIe cryptographic coprocessor, which is a hardware security module (HSM) that includes a secure coprocessor implemented on a high-security, tamper-resistant, programmable Peripheral Component Interconnect express (PCIe) board. (IBM is a registered trademark of International Business Machines Corporation in at least one jurisdiction.) Specialized cryptographic electronics, microprocessor, memory, and random number generator housed within a tamper-respondent environment provide a highly secure subsystem in which data processing and cryptography can be performed. Sensitive key material is never exposed outside the physically secure boundary in a clear format.

The IBM 4769 PCIe cryptographic coprocessor is designed to meet the Federal Information Processing Standard (FIPS) 140-2 Level 4, the highest level of certification available for commercial cryptographic devices. This cryptographic card can be used as part of a pervasive encryption and enterprise security system.

For instance, an example of a cryptographic card application offered by International Business Machines Corporation, Armonk, New York (USA), is a channel-attached Crypto Express' card (where Crypto Express is a trademark of International Business Machines Corporation in at least one jurisdiction). A Crypto Express card is defined to support multiple types of commands, such as commands using encrypted keys, commands using clear keys, hash commands, query commands, random number-generator commands, etc. Further, a Crypto Express card is designed to support multiple modes, such as, for instance, a common cryptographic architecture (CCA) mode, an accelerator mode, and an Enterprise Public Key Cryptographic Standards (PKCS) (a.k.a., XCP/EP11-Enterprise PKCS #11 mode). Each mode can be configured to process specific types of commands. By way of example, applications can include financial PIN transactions, bank-to-clearing house transactions, credit transactions for integrated circuit (chip) based credit cards, general purpose cryptographic applications using symmetric key algorithms, hashing algorithms, public key algorithms, etc. In one or more implementations, the operational keys (symmetric or asymmetric private (RSA or Elliptic-Curve)) are generated in the coprocessor and then saved, for instance, in a keystore file or in application memory, encrypted under the master key of that coprocessor. Any coprocessor with an identical matching key can then use those keys. In one or more implementations, cryptographic systems and/or cards such as described herein can be supported on certain mainframe computing environments, such as the IBM z/Architecture® computing environment (where z/Architecture® is a registered trademark of International Business Machines Corporation in at least one jurisdiction).

A certificate (referred to herein as a security certificate or digital certificate) is an electronic document or data file used to prove ownership and authenticity of a cryptographic key. Certificates currently in use typically incorporate a single cryptosystem, that is, the certificate contains one key and one signature, both generated using the same cryptosystem. In practice, the cryptosystem is typically an asymmetric cryptosystem, such as a Rivest-Shamir-Adleman (RSA) cryptosystem or Elliptic-Curve Cryptography (ECC) cryptosystem.

The asymmetric cryptosystems in use today rely on integer factorization (IF) and discrete logarithm problem (DLP), which will become vulnerable to attack by algorithms running on quantum computers. It is therefore desirable to transition to a cryptosystem that is more resistant to attack, both by conventional computers and quantum computers. One candidate for such a cryptosystem is a lattice-based cryptographic system, such as a Kyber cryptosystem, Dilithium cryptosystem, Saber cryptosystem, etc., which can preserve security robustness, in even in the presence of quantum computers. Advantageously, lattice-based cryptography systems typically have reasonably small key size, small cypher text size, and short execution timing. Lattice-based cryptography is typically built based on a worst-case computational assumption, such as Shortest Vector Problem (SVP) and Closest Vector Problem (CVP) in lattices.

Lattice-based cryptosystems, such as Kyber, Dilithium, Saber, etc., involve modular arithmetic operations. In one or more embodiments, such lattice-based cryptosystems use polynomial ring arithmetic, and governing parameters include an irreducible polynomial f(x), and a coefficient modulus q. The moduli in these operations is typically very small, for instance, 12-bits to 32-bits. Due to this, modular arithmetic accelerator units developed for, for instance, RSA or ECC fare poorly on lattice-based cryptosystems. In particular, polynomial multiplication can be slow on such systems, and for 'n' coefficients, $n^2$ modular multiplications are needed.

Learning With Errors (LWE) and ring-based Learning With Errors (ring-LWE) provide efficient ways to construct a lattice-based public key cryptography for post-quantum cryptography (PQC). Ring-LWE approaches rely heavily on number-theoretic transform (NTT) operations in key generation, encryption and decryption (that is, in cryptographic-related processing). A number-theoretic transform or discrete Fourier transform (DFT) over any ring, can be used to accelerate processing of a lattice-based cryptosystem. Advantageously, using NTT, element-wise binary multiplication can be employed during the cryptographic-related processing.

In one or more aspects, provided herein are implementations of lattice-based cryptosystems involving small moduli within a cryptographic coprocessor or accelerator that may have been built to accelerate large-integer modular arithmetic processes. The implementations disclosed herein advantageously leverage the fact that certain lattice-based cryptosystems for post-quantum computing use number-theoretic transforms (NTTs) as part of the cryptosystem's process specification.

In one or more embodiments, disclosed herein is a coprocessor or accelerator configured as an n×n-bit multiplier which performs, for instance, the NTT operation in a single instruction, multiple data (SIMD) manner by packing multiple operands into a large integer, referred to herein as a packed integer, and then passing the integer through the accelerator. In one or more implementations, the accelerator can be configured as or with a modular multiplier that facilitates implementing Barret or Montgomery multiplications. Each binary multiplier generates in operation two parts of the product, a high-order and low-order part. Of these two parts, only one or both are passed on to the next stage, and they can be passed on separately. As described herein, operands can be packed into a large integer in such a way that there is a gap between adjacent operands. In this manner, when binary multiplication happens, none of the results will be corrupted due to the other operands being present. Advantageously, a coprocessing or accelerator processing disclosed herein is designed such that the higher-order and lower-order parts can be separated out on a per-operand basis to form two parts that the accelerator then treats has higher-order parts and lower-order parts. Thus, using routing and muxing, SIMD modular multiplication is implemented on the accelerator unit that implements large-integer modular multiplication.

By way of example only, one embodiment of a computing environment to incorporate and use one or more aspects of the present invention is described with reference to FIG. 1A. In one example, a computing environment 100 includes at least one central processing unit 102 and at least one adjunct processor (AP) 104, each of which is coupled to at least a portion of memory, referred to as system memory 106. As one example, system memory 106 includes a hardware system area, which is indirectly accessible and not visible to programs executing on the central processing unit(s). (Indirectly accessible is used herein to mean that the hardware system area or adjunct processor queue(s) stored therein (described below) are only accessible by specific limited instructions and not otherwise accessible (e.g., cannot load into it, programs are unaware of addresses, etc.)). Located within the system memory are one or more adjunct processor queues 108. These queues are not directly visible from user programs and are instead considered a part of the machine (i.e., the machine that includes the central processing unit(s), system memory and adjunct processor(s)). A central processing unit has access to the queues in system memory by, for instance, issuing instructions to place requests on the queue, and/or to remove replies from the queue. The adjunct processor, however, does have direct access to the queues via, e.g., a transport layer 110, and is responsible for taking requests off the queue, processing the requests, and placing replies to the requests on the queue.

Figure 1B:
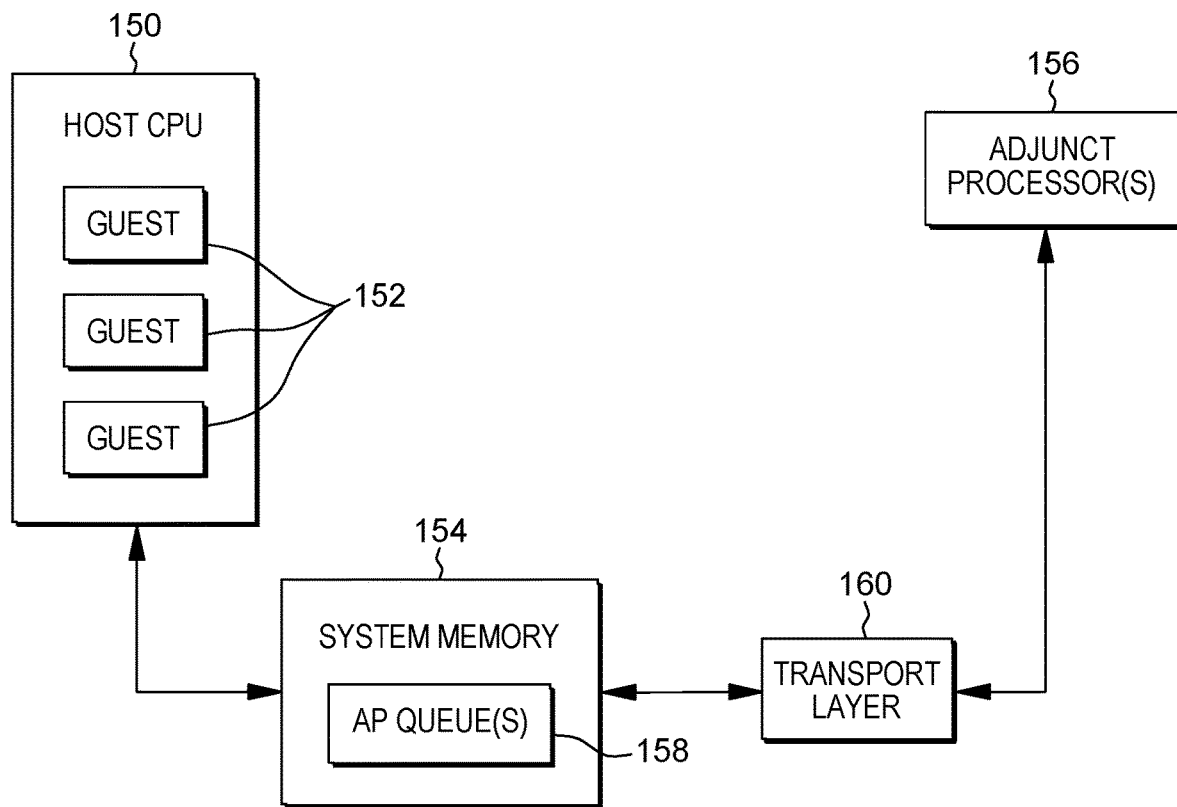
FIG. 1B depicts another embodiment of a computing environment to incorporate and use one or more aspects of the present invention.

Another embodiment of a computing environment to incorporate and use one or more aspects of the present invention is described with reference to FIG. 1B. In this embodiment, the machine includes virtual support, and there is at least one host central processing unit 150 that includes a plurality of guests 152 (e.g., guest operating systems and/or guest programs). The host central processing unit is coupled to at least a portion of memory, referred to as system memory 154. Additionally, there is at least one adjunct processor 156, which is also coupled to system memory 154, via, for instance, a transport layer 160. As one example, system memory 154 includes a hardware system area, and located within the system memory are one or more adjunct processor queues 158.

As indicated, there are different types of adjunct processors, including but not limited to, cryptographic cards or adapters. A specific example of a cryptographic card is a Crypto Express card offered by International Business Machines Corporation, Armonk, New York Although an example cryptographic card is provided, other cryptographic cards offered by International Business Machines Corporation and/or other companies may incorporate and/or use one or more aspects of the present invention. Further, other types of processors can incorporate and/or use one or more aspects of the present invention.

In one embodiment, an adjunct processor, such as a cryptographic card (e.g., a Crypto Express card), can support a plurality of modes including, but not limited to, a co-processor mode, an accelerator mode, and an Enterprise Public Key Cryptographic Standards (PKCS) mode (e.g., XCP/EP11-Enterprise PKCS #11), as examples. Additional, fewer and/or other modes can be supported in other examples. Each of the modes can have its own AP message structures and formats.

As an example, an adjunct processor message is comprised of multiple data segments and the data segments may not be adjacent to each other; instead, one or more may be interleaved. These data segments are referred to as scatter gather data segments. In one example, a cryptographic card does not have direct access to the enqueued AP message and a portion of the message (e.g., the bottom part of the AP message) contains the data to be used by, e.g., the cryptographic card to execute the AP command. Therefore, the AP command transport layer (e.g., transport layer 110, 160) copies the relevant data from the AP command request message, packages it in a format that the cryptographic card understands (e.g., cryptographic card's command request message) and sends it to the cryptographic card. Similarly, after the AP command is executed by the cryptographic card, the AP command transport layer generates an AP command reply message using various parts of the AP command request message and the cryptographic card's command reply message and sends it to the AP queue to be dequeued later by the program.

Aspects of a hybrid security certificate facility are described herein with respect to a particular architecture, such as the z/Architecture® hardware architecture, offered by International Business Machines Corporation, Armonk, New York One embodiment of the z/Architecture® hardware architecture is described in "z/Architecture Principles of Operation", IBM Publication No. SA22-7832-12, 13$^{th}$ Edition, September 2019, which is hereby incorporated herein by reference in its entirety. The z/Architecture hardware architecture, however, is only one example architecture. Aspects of the invention may also be based on other architectures, including, but not limited to, the Intel x86 architectures, other architectures of International Business Machines Corporation, and/or architectures of other companies.

Figure 2:
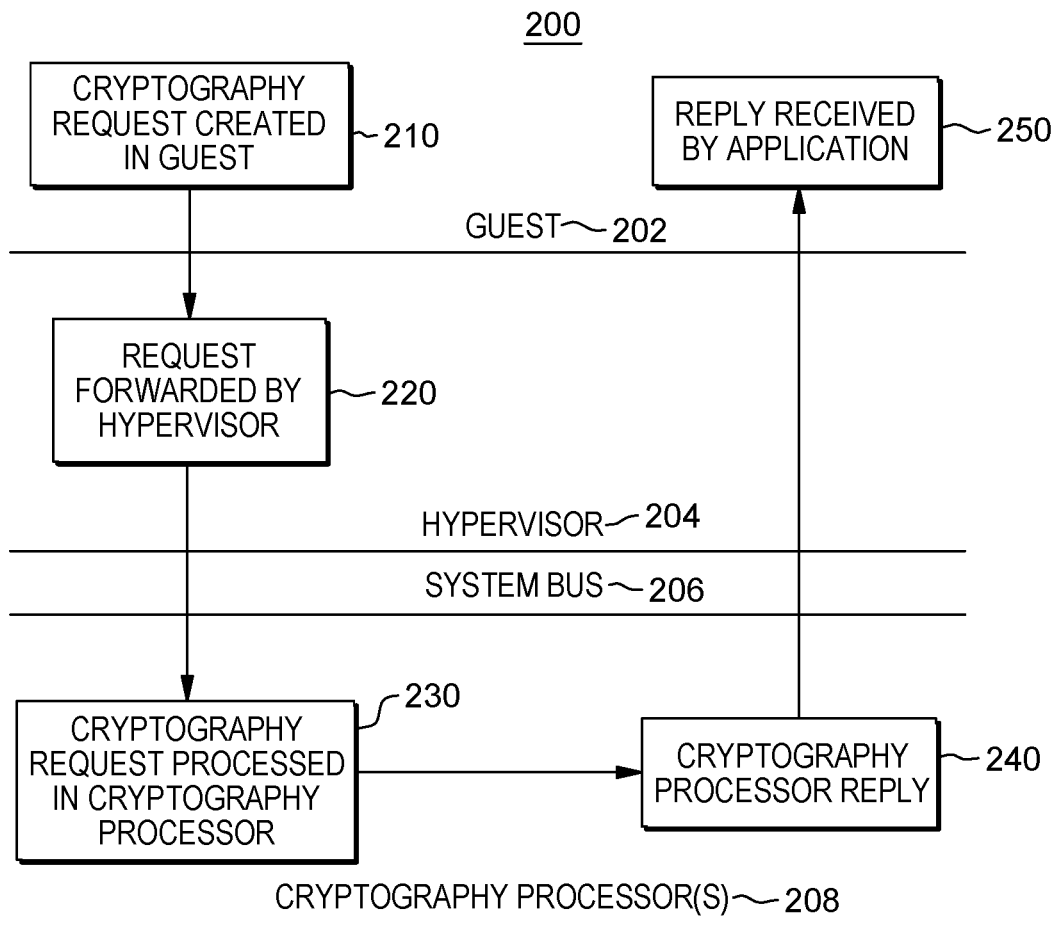
FIG. 2 depicts one embodiment of a process flow within a computing environment with secure communication, in accordance with one or more aspects of the present invention.

By way of example, FIG. 2 depicts one embodiment of a computing environment 200, where command request/reply messages (i.e., data) can use cryptographic adapter/card processing to obtain a security certificate, such as described herein. In the embodiment of FIG. 2, the cryptographic processor can be an adjunct processor such as described above in connection with the embodiments of FIGS. 1A & 1B. Referring to FIG. 2, in one embodiment, a cryptographic request 210 is created by a requester, such as a guest 202 (e.g., a guest application or a guest operating system in, for instance, a cloud environment), STEP 210. In one example, an AP command request message can be encoded, and provided to a hypervisor 204.

The cryptographic request is obtained (e.g., received, retrieved, provided, etc.) by hypervisor 204 from guest 202, and processed for forwarding, STEP 220. This processing can include, for instance, consideration of permissible command types to be processed for the requestor, based on the requestor's computing policy. Hypervisor 204 provides the request message 210 to an adjunct processor (e.g., a cryptographic processor 208). For instance, hypervisor 204 sends or forwards the request message to the adjunct processor via, for instance, a system bus 206, or the adjunct processor otherwise obtains (e.g., retrieves) the request message via system bus 206.

The adjunct processor, such as cryptographic processor 208 (in this example) processes the request, STEP 230. Assuming that the request is allowed, it is processed (e.g., operations of command are performed), and a cryptographic processor reply 240 is generated (STEP 240), which can include, in one embodiment, placing the reply in an AP command reply message, and sending it to guest 202 via, for instance, a transport layer (e.g., transport layer), STEP 250. The reply can include results of the processing, such as a generated security certificate, which can use, in part, processing such as described herein (in one embodiment).

Figure 3:
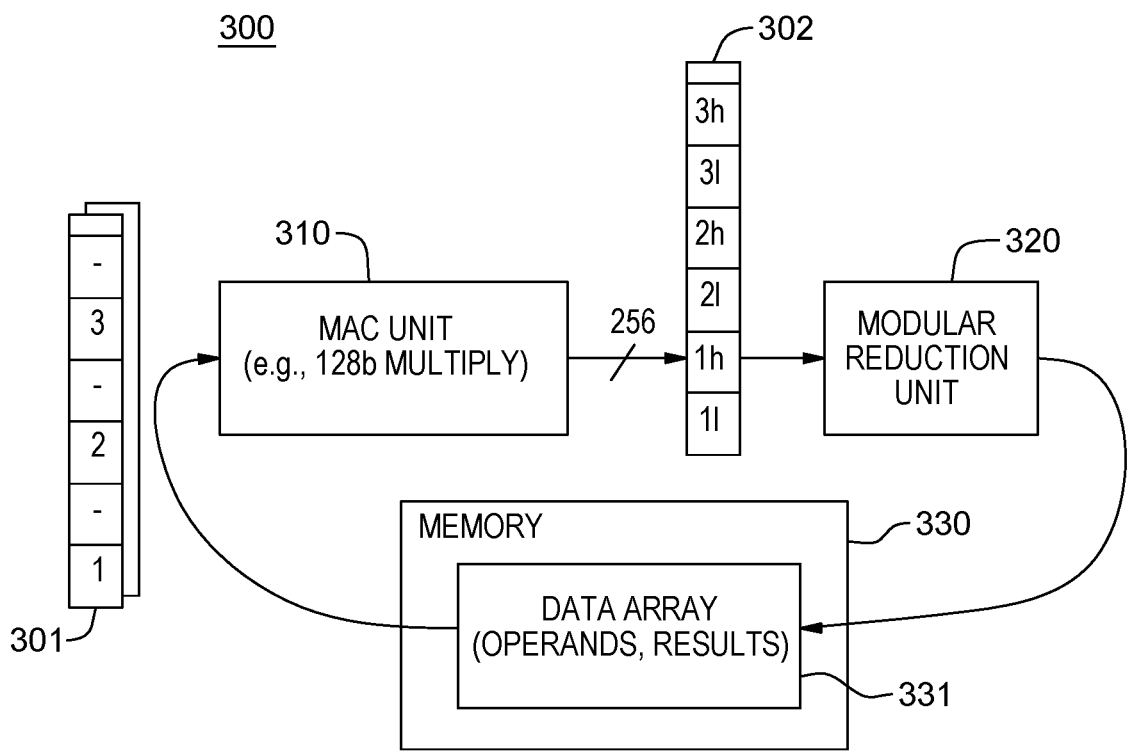
FIG. 3 depicts a block diagram of one technical implementation of one or more aspects of facilitating cryptographic-related processing, in accordance with one or more aspects of the present invention.

FIG. 3 depicts a block diagram of one technical implementation of one or more aspects of facilitating cryptographic-related processing, in accordance with one or more aspects of the present invention. As illustrated, an accelerator 300 is provided which includes, in one embodiment, a multiply and accumulate (MAC) unit 310, a modular reduction unit 320, and memory 330, which includes a data array 331 containing, for instance, operands to undergo processing, as well as result data received from modular reduction unit 320.

In one or more embodiments, accelerator 300 is used to facilitate modular multiplication using Barrett or Montgomery multiplication as part of cryptographic-related processing, such as the above-noted lattice-based cryptography. Both the Barrett and Montgomery algorithms require a precomputation, have three multiplication stages, one subtraction stage, and one condition correction stage. For instance, the Barrett approach includes:

| | Require: k = bitwidth, a, b = operands, p = prime Return: r = (a × b) % p | | Bitwidth Calculations |
|---|---|---|---|
| 1 | Calc (or input) | $\mu = \text{floor } \dfrac{2^{2k}}{p}$ | (2k+1) − k = k + 1 |
| 2 | Binary mul | res = a × b | k × k = 2k |
| 3 | Binary mul | $q^2$ = res(1 + hi) × μ | (k +1) × (k + 1) = 2k + 2 |
| 4 | Binary mul | $r^2 = q^2(1 + \text{hi}) \times p$ | (k + 1) × k = 2k + 1 |
| 5 | Binary sub | r = res(lo + 1) − $r^2$(lo + 1) | (k + 1) − (k + 1) = (k + 1) |
| 6 | Correct r − Add $2^{k+1}$ or subtract p or subtract 2p | | (k + 1) → k |

To facilitate use of accelerator 300, one or more instructions can be provided. For instance, a modular multiply instruction (mamm), a modular add instruction (mama), and a modular subtract instruction (mams) are defined to facilitate the processing. For instance, a modular multiply instruction can include fields mamm, a, b, c, d. In this instruction, a, b, c, d are registers in a processor or computing core, and the accelerator performs, in one embodiment, the operation:

$$c = a \times b \bmod p,$$

where (in one embodiment):
  p is the underlying modulus that is loaded prior to executing the instruction;
  d=0 performs 128-bit arithmetic;
  d=16 performs 16-bit arithmetic on four consecutive 16-bit integers read from locations a, b;
  d=32 performs 32-bit arithmetic on two consecutive 32-bit integers read from locations a, b;
  other values of d (1, 2, etc.) can enable other multiplications, such as 256-bit, 384-bit . . . 1024-bit multiplications.

By way of example, accelerator 300 in FIG. 3 can receive as input two n-bit packed integers 301. The packed integers are obtained by, for instance, retrieving multiple input operands from data array 331 and packing the multiple input operands together to form the two packed integers. As used herein, packed integer can be an n-bit integer with multiple different input operands packed or located as described herein for, for instance, enhanced processing using large-integer modular multiplication. In the packed integer, input operands of the multiple input operands are packed into every other slot of multiple slots in the integer, with each slot of the multiple slots having a bitwidth k. For instance, where bitwidth k is 16-bits, every other 16-bits in the packed integer has an input operand, with, for instance, a null value in the bitwidth k between the slots having the operands. Where d is defined in the instruction such that n is, for instance, 128-bits or less, then MAC unit 310 performs 128-bit modular multiply using the two packed integers, each 128-bit multiply, producing a 256-bit result 302 which passes through the accumulator. The result 302 is fed to a modular reduction unit 320 for further processing, such as described herein with reference to FIGS. 4-6. In one embodiment, result 302 includes low-parts (1*l*, 2*l*, 3*l*, etc.) and high-parts (1*h*, 2*h*, 3*h*, etc.), which can be shuffled and repacked into additional n-bit integers for further processing within modular reduction unit 320, such as described below.

Figure 4:
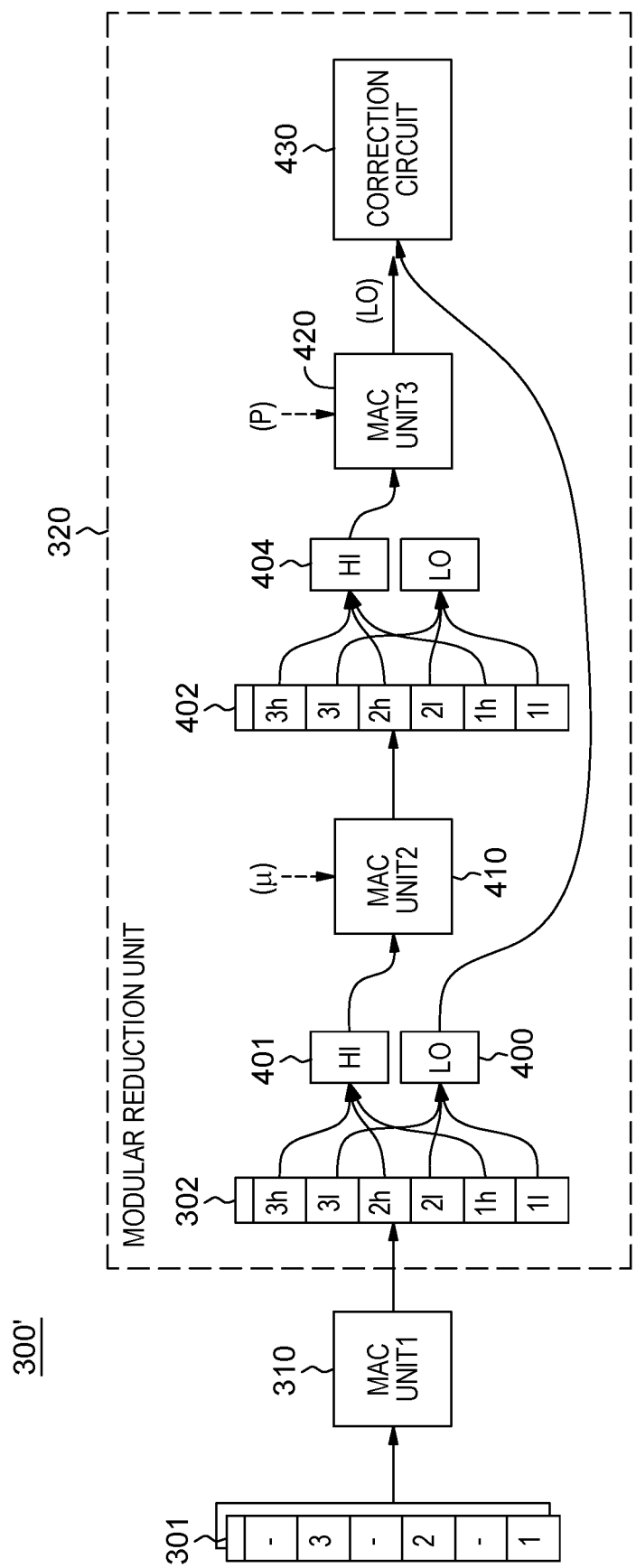
FIG. 4 is a block diagram of another technical implementation of one or more aspects of facilitating cryptographic-related processing, in accordance with one or more aspects of the present invention.

By way of example, FIG. 4 depicts in greater detail one embodiment of a modular reduction unit, in accordance with one or more aspects disclosed herein. In the depicted embodiment, an accelerator 300' is depicted, which includes a multiply and accumulate (MAC) unit 310 that facilitates SIMD-style processing of multiple smaller operands in a large-integer modular multiplication process. The intermediate result 302 is, in one embodiment, shuffled by separating the low-order parts of the result, and the high-order parts for separate processing. For instance, a low-part packed integer 400 and a high-part packed integer 401 are obtained by the shuffling and repacking, with the low-part packed integer being a respective n-bit integer having multiple slots, where low-order parts of intermediate result 302 are packed into every other slot of the multiple slots, with each low-order part being k-bits wide, starting from a least-significant bit of a respective result component of the intermediate result. The high-part packed integer 401 is also a respective n-bit integer including multiple slots, where high-order parts of the intermediate result are packed into every other slot of the multiple slots, with each high-order part being k-bits wide, starting from a most-significant bit of the respective result component of the intermediate result 302. The low-order packed integer 400 and high-part packed integer 401 are separately used to facilitate obtaining the result data, which facilitates the cryptographic-related processing. For instance, another multiply and accumulate (MAC) unit 410 receives as input the high-part packed integer 401 to, for instance, multiply the integer by a predetermined constant u, where the predetermined constant u is dependent, in part, on the bitwidth k, such as described above. The result of performing this further arithmetic operation is the generation of another intermediate result 402, which again includes multiple result components, each with low-order and high-order parts (1$l$, 1$h$, 2$l$, 2$h$, 3$l$, 3$h$, etc.).

In one embodiment, the modular reduction unit 320 is configured to separate out the high-order parts of the multiple result components into another high-part packed integer 404, where the other high-part packed integer is another n-bit integer including multiple slots, where high-order parts of the multiple result components of the other intermediate result 402 are packed into every other slot of the multiple slots. As illustrated, the high-order packed integer 404 is fed to a further multiply and accumulate (MAC) unit 420, which performs a further arithmetic operation using the high-part packed integer 404, and a predetermined prime value p to obtain a further intermediate result, that includes multiple result components and which is fed to a correction circuit or unit 430. In particular, in one embodiment, the modular reduction unit shuffles and repacks the intermediate result output from multiply and accumulate unit 420 to obtain a further low-part packed integer, which is a further n-bit integer that includes multiple slots, where low-order parts of the multiple result components of the further intermediate result output from multiply and accumulate unit 420 are packed into every other slot of the multiple slots. The correction circuit 430 performs one or more correction operations using the further low-part packed integer fed from the multiply and accumulate unit 420, and the low-part packed integer 400, in order to obtain result data used to facilitate the cryptographic-related processing. The result obtain includes the results of k modular multiplications, each modulo the same underlying prime number. Such computations, where numerous modular multiplications are to be computed in parallel, are common in lattice-based cryptographic algorithms, such as discussed herein.

FIG. 5 depicts one technical implementation of a correction circuit or unit for an accelerator such as described herein. In one or more embodiments, correction circuit 430 includes multiple adder circuits 500, such as 8 16-bit adder circuits, in one implementation, where the integers being input to the correction circuit are, for instance, the above-noted further low-part packed integer output of multiply and accumulate unit 420 of FIG. 4, and the low-part packed integer 400 obtained from shuffling the output from the multiply and accumulate unit 310, in one or more embodiments. The operands in the packed integers are referred to as a0-a7 and b0-b7 in FIG. 5.

In one embodiment, correction circuit 430 performs addition and subtraction as needed to obtain the final desired result. In correction circuit 430 of FIG. 5, 8 16-bit adder circuits are used, with the carry from one circuit cascading to the next, unless blocked for a particular bitwidth-k mode, that is, whether (in one example) processing is in a 16-bit mode or a 32-bit mode. In implementation, correction circuit 430 performs one 128-bit addition, 8 16-bit additions, or four 32-bit additions, by way of example. As illustrated, the carry-off is blocked in the 16-bit mode, and the carry-off from alternate adder circuits 500, starting from the second circuit in the series, is blocked in the 32-bit mode.

As noted, the NTT algorithm includes multiple modular multiplications, additions and subtractions. Pursuant to the accelerator and processing disclosed herein, the NTT process is accelerated to facilitate modular operations for, for instance, four 16-bit operands or two 32-bit operands in a single instruction (by way of example only). Code for implementing an iterative NTT process can be represented as:

| Iterative NTT |
|---|
| Input: Polynomial a(x) ∈ $\mathbb{Z}_q$[x] of degree n−1 and n$^{th}$ primitive root $\omega_m$ ∈ $\mathbb{Z}_q$ of unity<br>Output: Polynomial A(x) ∈ $\mathbb{Z}_q$[x] = NTT$_{(a)}$<br>1:    A ← BitReverse(a)  ▶ permutation of coefficients<br>2:    for m = 2 to n by m = 2m do<br>3:        $\omega_m$ ← $\omega_m^{n/m}$<br>4:        $\omega$ ← 1<br>5:        for j = 0 to m/2−1 do  ▶ butterfly loop<br>6:            for k = 0 to n−1 by m do<br>7:                t ← $\omega$ × A[k+j+m/2]<br>8:                u ← A[k+j]<br>9:                A[k+j] ← u+t<br>10:             A[k+j+m/2] ← u − t<br>11:          end for<br>12:          $\omega$ ← $\omega$ × $\omega_m$<br>13:        end for<br>14:    end for |

Figure 6A:
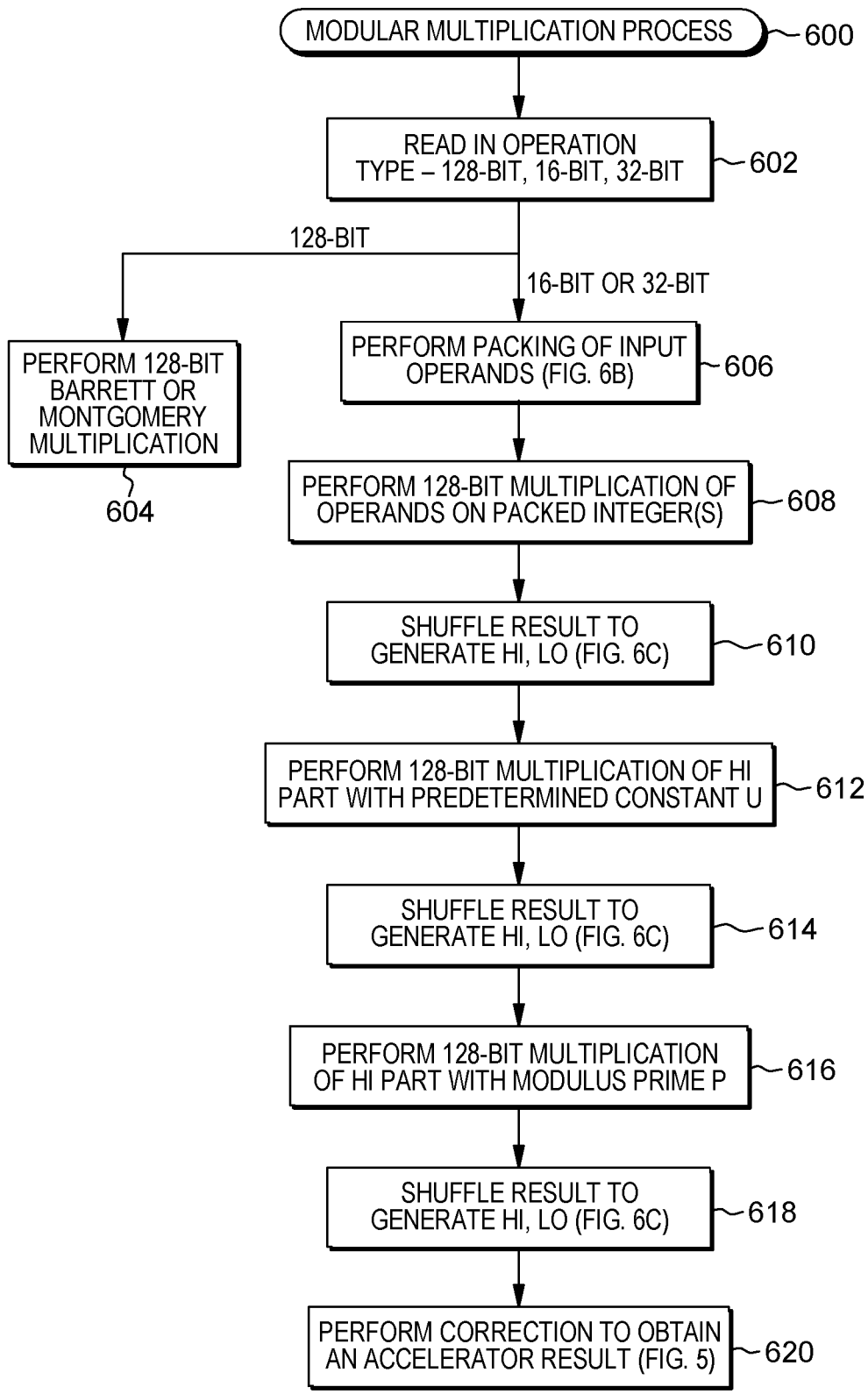
FIGS. 6A-6C depict one embodiment of a workflow illustrating certain aspects of one or more embodiments of the present invention.
Figure 6B:
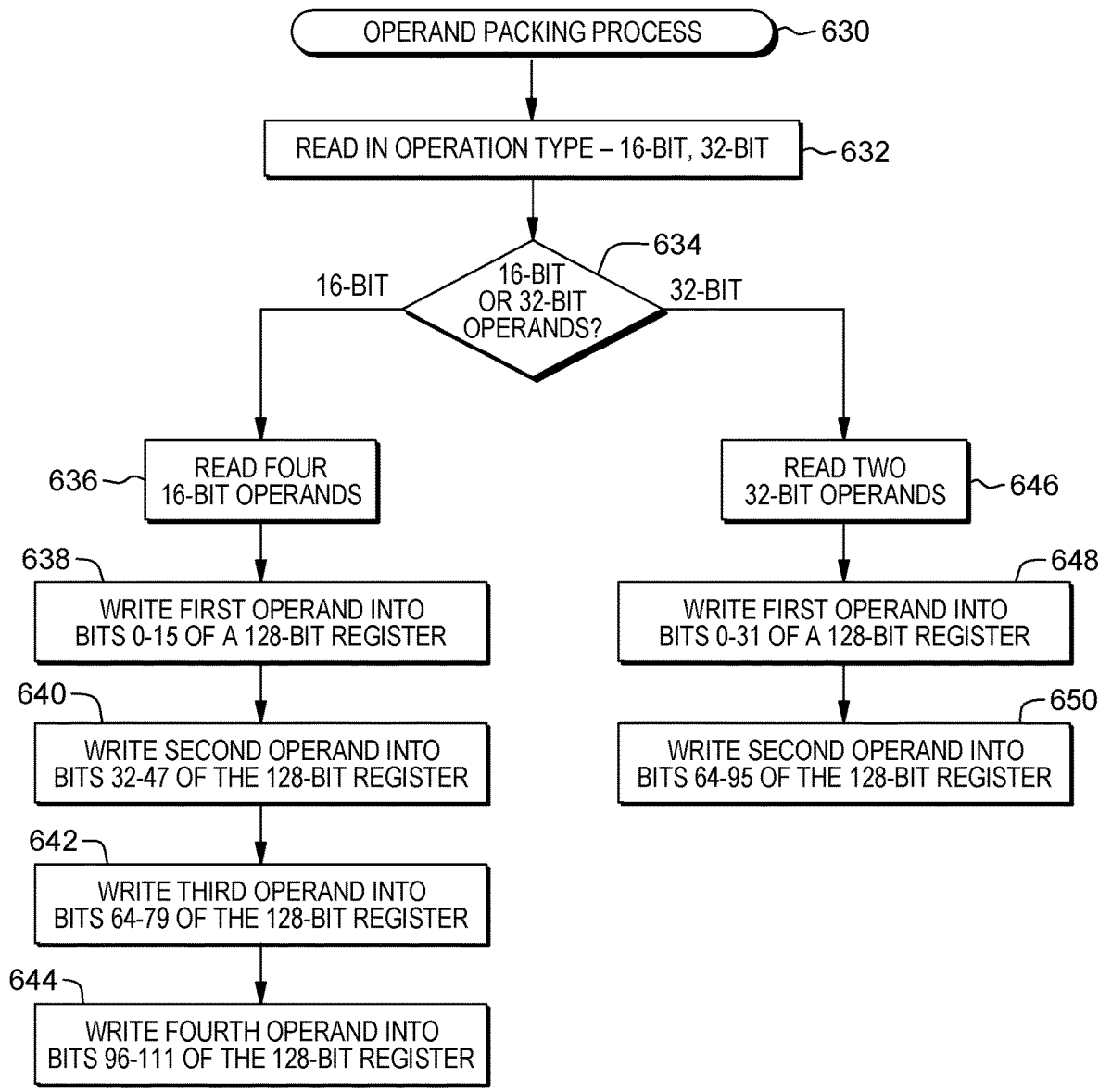
Figure 6C:
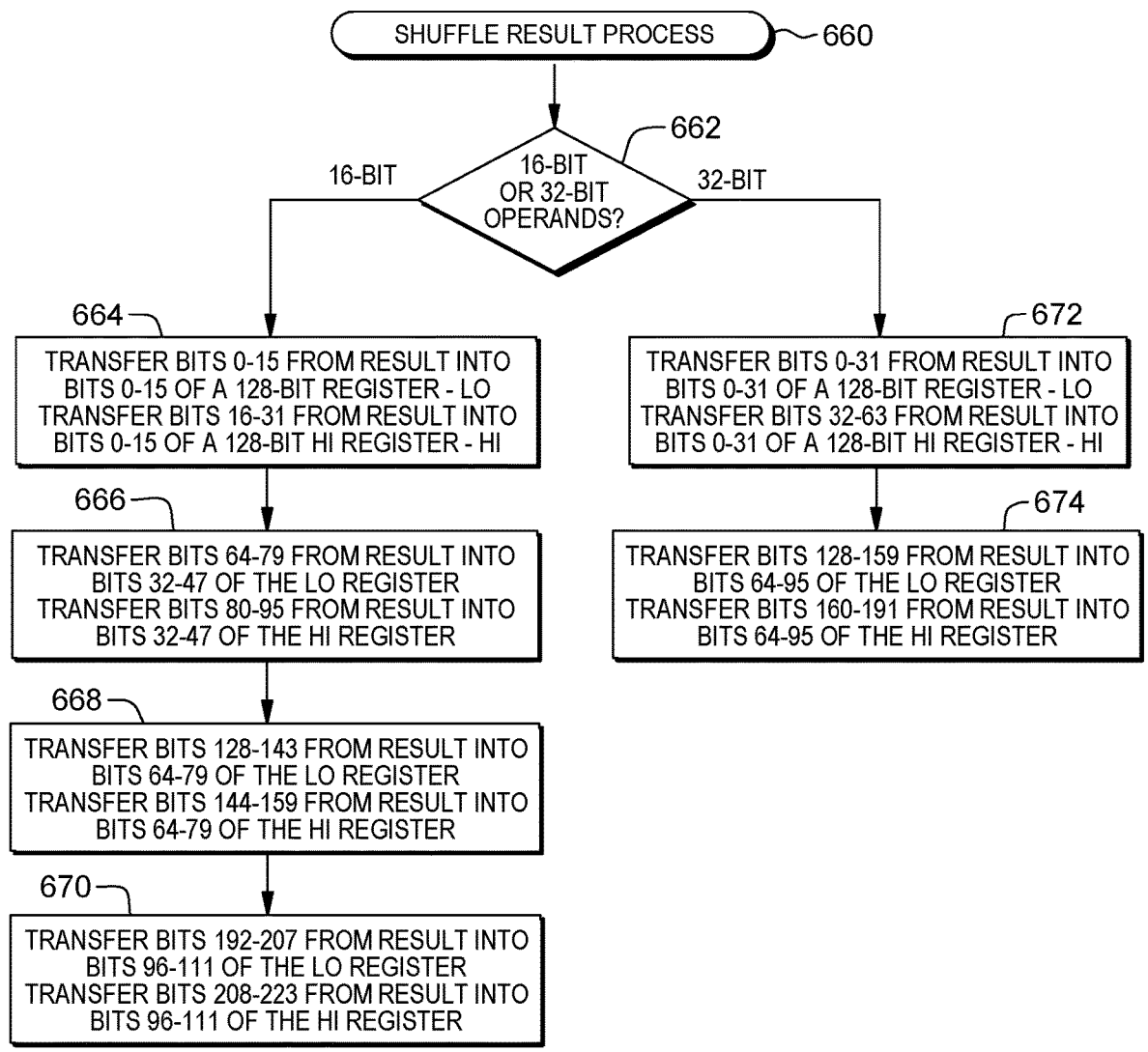

By way of example, FIGS. 6A-6C depict a modular multiplication example that can be used to implement step 7 of the above-noted NTT process, where the inner loop is unrolled by a factor of two for 32-bit, and by four for 16-bit. Thus, a single instruction performs two or four iterations of the loop. Existing lattice-based cryptographic systems (Kyber, Dilithium, etc.) are based on ring-LWE, and explicitly have NTT as part of their specifications, or can be accelerated using NTT processing as described herein.

FIGS. 6A-6C depict one embodiment of a workflow illustrating certain aspects of one or more embodiments of the present invention disclosed herein.

Referring to FIG. 6A, an accelerator such as described herein, implements, in one embodiment, a modular multiplication process 600, which includes reading in the operation type, whether, for instance, 128-bit, 16-bit, or 32-bit 602 type or mode, by way of example only. Where the accelerator is implemented using one or more 128-bit multiply and accumulate units, and is configured to receive a 128-bit integer, then 128-bit Barrett or Montgomery multiplication 604 is performed using the accelerator. However, where the operation type is either 16-bit or 32-bit (i.e., where bitwidth k is 16-bits or 32-bits), then packing of the input operands is perform 606, one embodiment of which is depicted in FIG. 6B.

Referring to FIG. 6B, one embodiment of operand packing processing 630 includes determining the operation type, that is, determining whether the accelerant is in 16-bit or 32-bit mode, and branching separately 634 dependent on whether the bitwidth k is 16-bits or 32-bits. Assuming that the bitwidth k is 16-bits, then four 16-bit operands are obtained, for instance, read from memory 636. In one embodiment, a first operand is written into bits 0-16 of a 128-bit register 638, a second operand is written into bits 32-47 of the 128-bit register 640, a third operand is written into bits 64-79 of the 128-bit register 642, and a fourth operand is written into bits 96-111 of the 128-bit register 644. Where the operation type is 32-bits, then two 32-bit operands are obtained, such as by reading from memory 646. In one embodiment, a first operand is written into bits 0-31 of the 128-bit register 648, and a second operand is written into bits 64-95 of the 128-bit register 650. Note that by using the process of packing the operands into every other slot of the multiple slots of the packed integer, null values of bitwidth k are present in the slots in between those slots where the operands are loaded or packed.

Referring to FIG. 6A, 128-bit multiplication of operands of the packed integer 608 is performed. For instance, in one embodiment, two packed integers are multiplied, for instance, within the accelerator, such as described above in connection with FIG. 3. An intermediate result is obtained from the multiplication, which includes multiple result components, as described above. As illustrated, the result can be shuffled 610 to generate high- and low-parts, as illustrated in FIG. 6C. Generally, the shuffling and repacking of the intermediate result is to obtain a low-part packed integer and a high-part packed integer, where the low-part packed integer is a respective 128-bit integer (in this example) including multiple slots, where low-order parts of the intermediate result are packed into every other slot of the multiple slots, with each low-order part being k-bits wide, starting from a least-significant bit of a respective result component of the intermediate result. Similarly, the high-part packed integer is a respective 128-bit integer (in this example) including multiple slots, where the high-order parts of the intermediate results are packed into every other slot of the multiple slots, with each high-order part being k-bits wide, starting from a most-significant bit of a respective result component of the intermediate result. FIG. 6C illustrates an example of this.

As shown in FIG. 6C, the shuffling and repacking process 660 includes determining whether 16-bit or 32-bit operands were initially loaded 662. Assuming 16-bit operands, then in one embodiment, the accelerator transfers bits 0-15 from the intermediate result into bits 0-15 of a 128-bit register-LO, and transfers bits 16-31 from the intermediate result into bits 0-15 of a 128-bit register-HI 664. Further, the accelerator transfers bits 64-79 from the intermediate result into bits 32-47 of the LO register, and transfers bits 80-95 from the result into bits 32-47 of the HI register 666. Further the accelerator transfers bits 128-143 from the intermediate result into bits 64-79 of the LO register, and transfers bits 144-159 from the result into bits 64-79 of the HI register 668. Additionally, the accelerator transfers bits 192-207 from the intermediate result into bits 96-111 of the LO register, and transfers bits 208-223 from the result into bits 96-111 of the HI register 670.

For 32-bit operands, the accelerator transfers bits 0-31 from the intermediate result into bits 0-31 of a 128-bit register-LO, and transfers bits 32-63 of the result into bits 0-31 of a 128-bit register-HI 672. Further, the accelerator transfers bits 128-159 from the intermediate result into bits 64-95 of the LO register, and transfers bits 160-191 of the intermediate result into bits 64-95 of the HI register 674. Note that the operand sizes and transfer positions of the different result components are provided herein by way of example only.

Referring to FIG. 6A, the accelerator performs 128-bit multiplication of the high-part packed integer with the precomputed constant u 612, determined as described above. The result obtained from this multiplication is shuffled and repacked to again generate high-part and low-part packed integers 614, as described above in connection with FIG. 6C. In one embodiment, the accelerator is configured to perform 128-bit multiplication of the high-part packed integer with a provided modulus prime p 616, with the result again being shuffled and unpacked 618 to generate high-part and low-part packed integers, for instance, using the process of FIG. 6C. The accelerator then performs correction processing 620, to generate a final result, such as described herein.

Further details of one embodiment of facilitating cryptographic-related processing within a computing environment, as it relates to one or more aspects of the present invention, are described with reference to FIGS. 7A-7B.

Referring to FIG. 7A, in one embodiment, multiple input operands are obtained 700, and the multiple input operands are packed together to form a packed integer 702. The packed integer is an n-bit integer including multiple slots, where input operands of the multiple input operands are packed into every other slot of the multiple slots, and each slot of the multiple slots has a bitwidth k. The packed integer is provided to an n-bit accelerator to facilitate performing one or more predefined operations using the packed integer, to transform the packed integer into result data which facilitates cryptographic-related processing 704.

In one or more embodiments, the n-bit accelerator performs an arithmetic operation using the input operands packed in the packed integer to obtain an intermediate result including multiple result components 706. The intermediate result is shuffled and repacked to obtain a low-part packed integer and a high-part packed integer 708. The low-part packed integer is a respective n-bit integer including multiple slots, where the low-order parts of the intermediate result are packed into every other slot of the multiple slots, with each low-part being k-bits wide, starting from a least-significant bit of a respective result component of the intermediate result. The high-part packed integer is a respective n-bit integer including multiple slots, where high-order parts of the intermediate result are packed into every other slot of the multiple slots, with each high-order part being k-bits wide, starting from a most-significant bit of the respective result component of the intermediate result.

In one embodiment, the low-part packed integer and the high-part packed integer are separately used in facilitating obtaining the result data, which facilitates the cryptographic-related processing 710.

Referring to FIG. 7B, in one or more embodiments, the n-bit accelerator further performs another arithmetic operation using the high-part packed integer and a predetermined constant u 712. The predetermined constant u is dependent, in part, on the bandwidth k, where performing the other arithmetic operation generates another intermediate result including multiple result components. The other intermediate result is shuffled and repacked to obtain another high-part packed integer 714. The other high-part packed integer is another n-bit integer including multiple slots, where the high-order parts of the multiple result components of the other intermediate result are packed into every other slot of the multiple slots. The other high-part packed integer is then used to facilitate obtaining the result data which facilitates the cryptographic-processing 716.

In one embodiment, a further arithmetic operation is performed by the n-bit accelerator using the other high-part packed integer and a predefined prime value to obtain a further intermediate result including multiple result components 718. The further intermediate result is shuffled and repacked to obtain a further low-part packed integer 720. The further low-part packed integer is a further n-bit integer including multiple slots, where low-order parts of the multiple result components of the further intermediate result are packed into every other slot of the multiple slots. The further low-part packed integer is used in facilitating obtaining the result data, which facilitates the cryptographic-related processing 722.

In one embodiment, one or more correction operations are performed by the accelerator using, at least in part, the low-part packed integer to obtain the result data 724. In one embodiment, the packing include providing a null value of bitwidth k in a slot of the multiple slots located between two input operands of the multiple input operands packed into every other slot of the multiple slots 726.

In one embodiment, the result data facilitates lattice-based cryptographic processing, and the n-bit accelerator includes a modular arithmetic, hardware accelerator unit 728. In one example, the bitwidth k of the multiple slots includes one of 16-bits or 32-bits 730.

Other variations and embodiments are possible.

A hybrid security certificate facility of one or more aspects of the present invention may be incorporated and used in many computing environments. One example computing environment is described with reference to FIG. 8A. As an example, the computing environment is based on the z/Architecture® hardware architecture, offered by International Business Machines Corporation, Armonk, New York. The z/Architecture hardware architecture, however, is only one example architecture. The computing environment can also be based on other architectures, including, but not limited to, the Intel x86 architectures, other architectures of International Business Machines Corporation, and/or architectures of other companies.

As shown in FIG. 8A, a computing environment 800 includes, for instance, a computer system 802 shown, e.g., in the form of a general-purpose computing device. Computer system 802 may include, but is not limited to, one or more processors or processing units 804 (e.g., central processing units (CPUs)), a memory 806 (a.k.a., system memory, main memory, main storage, central storage or storage, as examples), and one or more input/output (I/O) interfaces 808, coupled to one another via one or more buses and/or other connections. For instance, processors 804, as well as one or more adjunct processors 821, and memory 806, are coupled to I/O interfaces 808 via one or more buses 810, and processors 804, 821 are coupled to one another via one or more buses 811.

Bus 811 is, for instance, a memory or a cache coherence bus, and bus 810 represents, e.g., one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

As examples, one or more special purpose processors (e.g., adjunct processors) can be separate from but coupled to one or more general purpose processors and/or can be embedded within one or more general purpose processors. May variations are possible.

Memory 806 may include, for instance, a cache 812, such as a shared cache, which may be coupled to local caches 814 of processors 804 and/or to adjunct processor(s) 821, via, for instance, one or more buses 811. Further, memory 806 may include one or more programs or applications 816, at least one operating system 818, one or more computer readable program instructions 820 and one or more cryptosystems 822. Computer readable program instructions 820 and cryptosystem(s) 822 can be configured to carry out functions of embodiments of aspects of the invention.

By way of example, in one embodiment, memory 806 (e.g., at least a hardware system area of memory 806) is coupled to one or more adjunct processors 821 via one or more adjunct processor buses 811, and in one or more embodiments, via an AP transport layer.

Computer system 802 can communicate via, e.g., I/O interfaces 808 with one or more external devices 830, such as a user terminal, a tape drive, a pointing device, a display, and one or more data storage devices 834, etc. A data storage device 834 can store one or more programs 836, one or more computer readable program instructions 838, and/or data, etc. The computer readable program instructions can be configured to carry out functions of embodiments of aspects of the invention.

Computer system 802 can also communicate via, e.g., I/O interfaces 808 with network interface 832, which enables computer system 802 to communicate with one or more networks, such as a local area network (LAN), a general wide area network (WAN), and/or a public network (e.g., the Internet), providing communication with other computing devices or systems.

Computer system 802 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 802. Examples, include, but are not limited to: microcode, device drivers, redundant processing units, external disk drive arrays, RAID systems, tape drives, and data archival storage systems, etc.

Computer system 802 can be operational with numerous other general-purpose or special purpose computing system environments or configurations. Examples of well-known computing systems, environments, and/or configurations that may be suitable for use with computer system 802 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 8B:
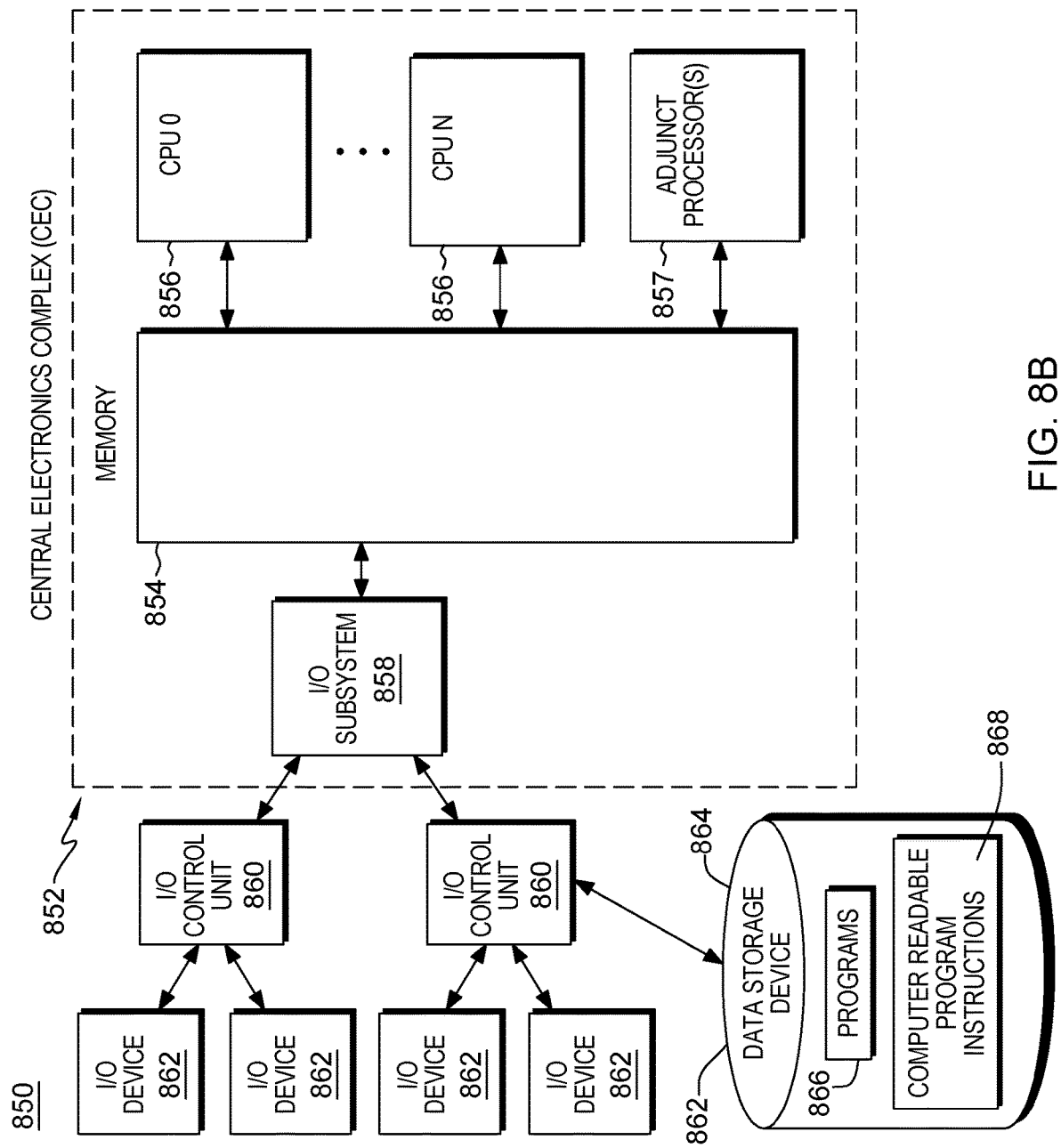
FIG. 8B depicts another example of a computing environment to incorporate and use one or more aspects of the present invention.

Another example of a computing environment to incorporate and use one or more aspects of the present invention is described below with reference to FIG. 8B. As an example, the computing environment of FIG. 8B can be based on the z/Architecture® hardware architecture offered by International Business Machines Corporation. The z/Architecture hardware architecture, however, is only one example architecture. Again, the computing environment may also be based on other architectures, including, but not limited to, the Intel x86 architectures, other architectures of International Business Machines Corporation, and/or architectures of other companies.

In one example, a computing environment 850 includes a central electronics complex (CEC) 852. CEC 852 includes a plurality of components, such as, for instance, a memory 854 (a.k.a., system memory, main memory, main storage, central storage, storage) coupled to one or more processors (a.k.a., central processing units (CPUs)) 856 and to an input/output (I/O) subsystem 858. Further, in one embodiment, memory 854 (e.g., at least a hardware system area of memory 854) is coupled to one or more adjunct processors 857 via one or more adjunct processor buses and, in one or more embodiments, via an AP transport layer.

I/O subsystem 858 can be a part of the central electronics complex or separate therefrom. It directs the flow of information between main storage 854 and input/output control units 860 and input/output (I/O) devices 862 coupled to the central electronics complex.

Many types of I/O devices may be used. One particular type is a data storage device 864. Data storage device 864 can store one or more programs 866, one or more computer readable program instructions 868, and/or data, etc. The computer readable program instructions can be configured to carry out functions of embodiments of aspects of the invention.

Central electronics complex 852 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central electronics complex 852. Examples include, but are not limited to: microcode, device drivers, redundant processing units, external disk drive arrays, RAID systems, tape drives, and data archival storage systems, etc.

Further, central electronics complex 852 can be operational with numerous other general-purpose or special-purpose computing system environments or configurations. Examples of well-known computing systems, environments, and/or configurations that may be suitable for use with central electronics complex 852 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 8D:
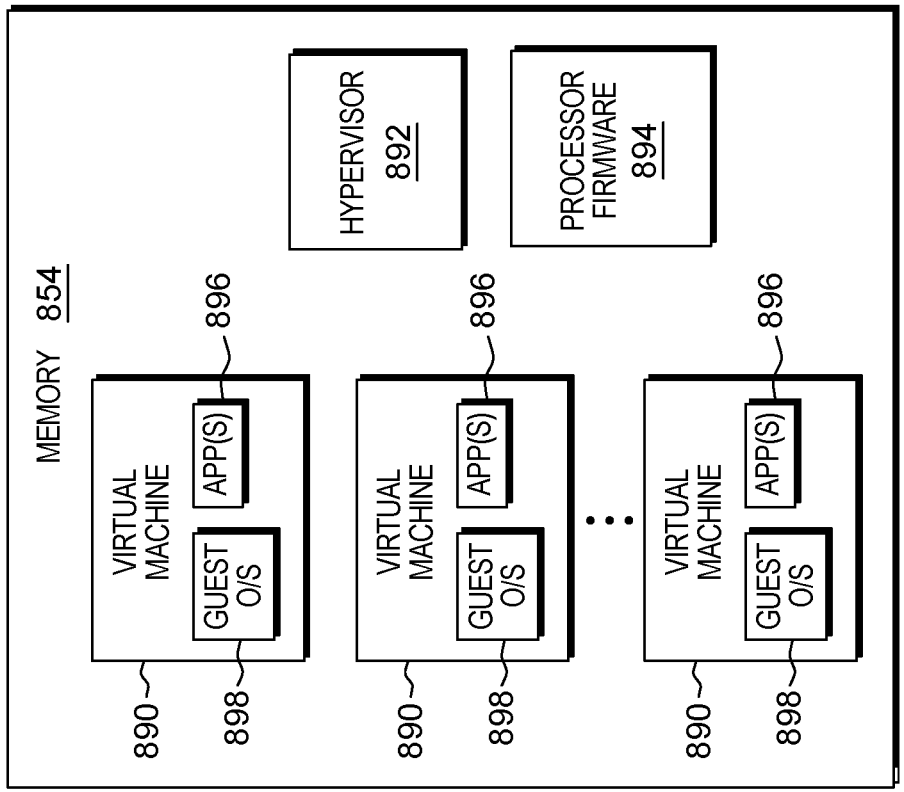
FIG. 8D depicts another example of further details of a memory of FIG. 8B, in accordance with one or more aspects of the present invention.
Figure 8C:
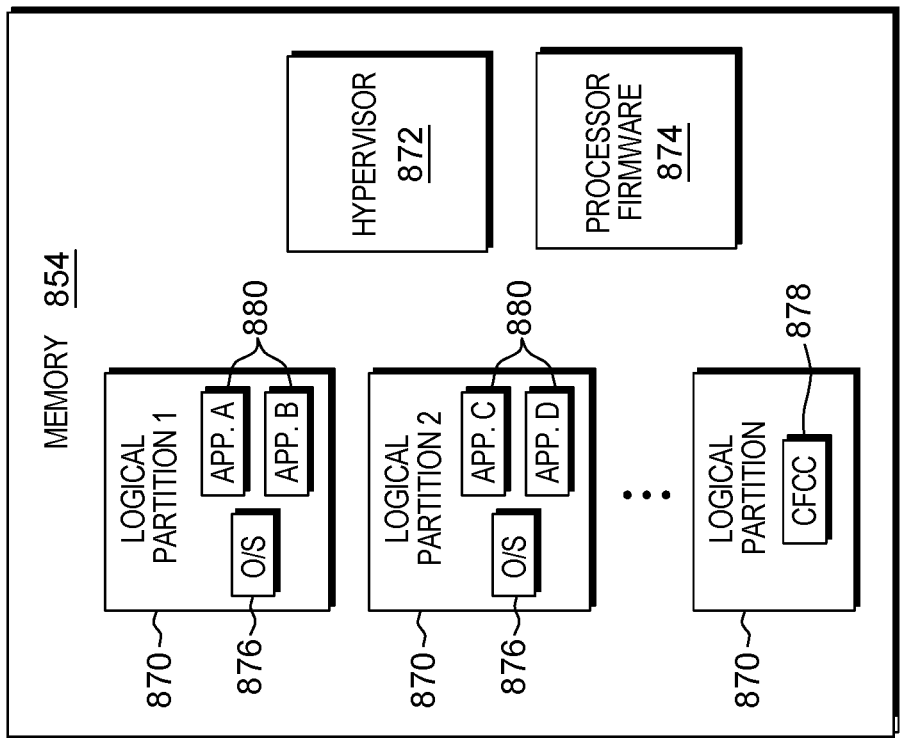
FIG. 8C depicts one example of further details of a memory of FIG. 8B, in accordance with one or more aspects of the present invention.

Central electronics complex 852 provides in one or more embodiments logical partitioning and/or virtualization support. In one embodiment, as shown in FIG. 8C, memory 854 includes, for example, one or more logical partitions 870, a hypervisor 872 that manages the logical partitions, and processor firmware 874. One example of hypervisor 872 is the Processor Resource/System Manager (PR/SM), offered by International Business Machines Corporation, Armonk, New York. As used herein, firmware includes, e.g., the microcode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Each logical partition 870 is capable of functioning as a separate system. That is, each logical partition can be independently reset, run a guest operating system 876 such as the z/OS® operating system, offered by International Business Machines Corporation, Armonk, New York, or other control code 878, such as coupling facility control code (CFCC), and operate with different programs 880. An operating system or application program running in a logical partition appears to have access to a full and complete system, but in reality, only a portion of it is available. Although z/OS is offered as an example, other operating systems may be used in accordance with one or more aspects of the present invention.

Memory 854 is coupled to CPUs 856 (FIG. 8B), which are physical processor resources that can be allocated to the logical partitions. For instance, a logical partition 870 includes one or more logical processors, each of which represents all or a share of a physical processor resource 856 that can be dynamically allocated to the logical partition.

In yet a further embodiment, the central electronics complex provides virtual machine support (either with or without logical partitioning support). As shown in FIG. 8D, memory 854 of central electronics complex 852 includes, for example, one or more virtual machines 890, a virtual machine manager, such as a hypervisor 892, that manages the virtual machines, and processor firmware 894. One example of hypervisor 892 is the z/VM® hypervisor, offered by International Business Machines Corporation, Armonk, New York. The hypervisor is sometimes referred to as a host. z/OS and z/VM are trademarks or registered trademarks of International Business Machines Corporation in at least one jurisdiction.

The virtual machine support of the CPC provides the ability to operate large numbers of virtual machines 890, each capable of operating with different programs 896 and running a guest operating system 898, such as the Linux® operating system. Each virtual machine 890 is capable of functioning as a separate system. That is, each virtual machine can be independently reset, run a guest operating system, and operate with different programs. An operating system or application program running in a virtual machine appears to have access to a full and complete system, but in reality, only a portion of it is available. Although z/VM and Linux are offered as examples, other virtual machine managers and operating systems may be used in accordance with one or more aspects of the present invention. The registered trademark Linux® is used pursuant to a sublicense from the Linux Foundation, the exclusive licensee of Linus Torvalds, owner of the mark on a worldwide basis.

Figure 9A:
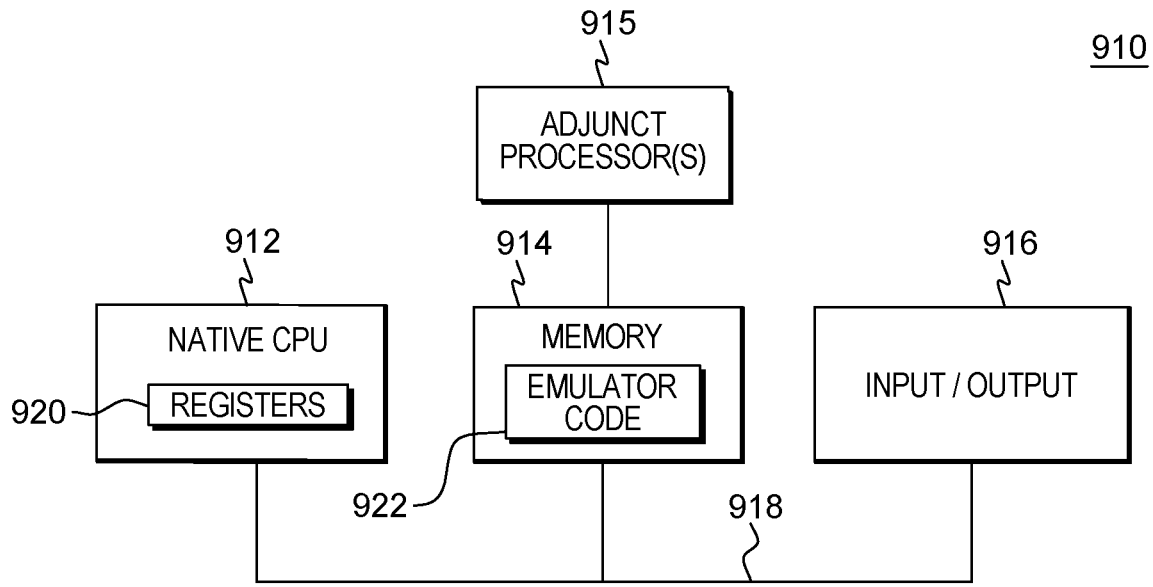
FIG. 9A depicts another example of a computing environment to incorporate and use one or more aspects of the present invention.

Another embodiment of a computing environment to incorporate and use one or more aspects of the present invention is described with reference to FIG. 9A. In this example, a computing environment 900 includes, for instance, a native central processing unit (CPU) 912, a memory 914, and one or more input/output devices and/or interfaces 916 coupled to one another via, for example, one or more buses 918 and/or other connections. As examples, computing environment 910 may include a PowerPC® processor offered by International Business Machines Corporation, Armonk, New York; an HP Superdome with Intel Itanium II processors offered by Hewlett Packard Co., Palo Alto, California; and/or other machines based on architectures offered by International Business Machines Corporation, Hewlett Packard, Intel Corporation, Oracle, or others. PowerPC is a trademark or registered trademark of International Business Machines Corporation in at least one jurisdiction. Intel and Itanium are trademarks or registered trademarks of Intel Corporation or its subsidiaries in the United States and other countries.

Native central processing unit 912 includes one or more native registers 920, such as one or more general purpose registers and/or one or more special purpose registers used during processing within the environment. These registers include information that represents the state of the environment at any particular point in time.

Moreover, native central processing unit 912 executes instructions and code that are stored in memory 914. In one particular example, the central processing unit executes emulator code 922 stored in memory 914. This code enables the computing environment configured in one architecture to emulate another architecture. For instance, emulator code 922 allows machines based on architectures other than the z/Architecture hardware architecture, such as PowerPC processors, HP Superdome servers or others, to emulate the z/Architecture hardware architecture and to execute software and instructions developed based on the z/Architecture hardware architecture.

Figure 9B:
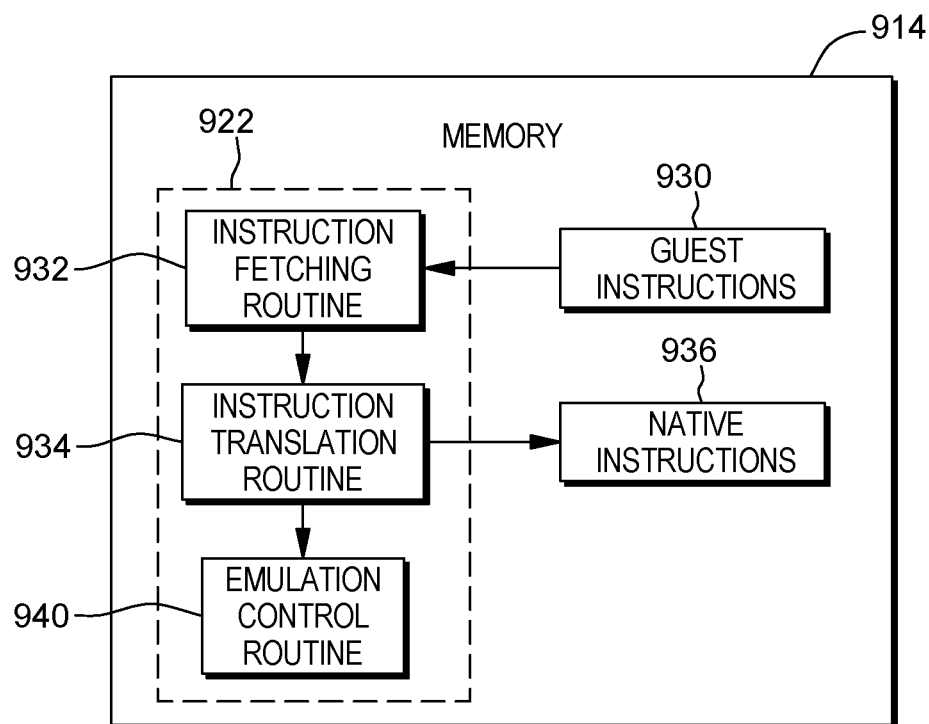
FIG. 9B depicts further details of the memory of FIG. 9A, in accordance with one or more aspects of the present invention.

Further details relating to emulator code 922 are described with reference to FIG. 9B. Guest instructions 930 stored in memory 914 comprise software instructions (e.g., correlating to machine instructions) that were developed to be executed in an architecture other than that of native CPU 912. For example, guest instructions 930 may have been designed to execute on a processor based on the z/Architecture hardware architecture, but instead, are being emulated on native CPU 912, which may be, for example, an Intel Itanium II processor. In one example, emulator code 922 includes an instruction fetching routine 932 to obtain one or more guest instructions 930 from memory 914, and to optionally provide local buffering for the instructions obtained. It also includes an instruction translation routine 934 to determine the type of guest instruction that has been obtained and to translate the guest instruction into one or more corresponding native instructions 936. This translation includes, for instance, identifying the function to be performed by the guest instruction and choosing the native instruction(s) to perform that function.

Further, emulator code 922 includes an emulation control routine 940 to cause the native instructions to be executed. Emulation control routine 940 may cause native CPU 912 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 936 may include loading data into a register from memory 914; storing data back to memory from a register; or performing some type of arithmetic or logic operation, as determined by the translation routine.

Each routine is, for instance, implemented in software, which is stored in memory and executed by native central processing unit 912. In other examples, one or more of the routines or operations are implemented in firmware, hardware, software or some combination thereof. The registers of the emulated processor may be emulated using registers 920 of the native CPU or by using locations in memory 914. In embodiments, guest instructions 930, native instructions 936 and emulator code 922 may reside in the same memory or may be disbursed among different memory devices.

Further, in one embodiment, computing environment 910 includes one or more adjunct processors 915 coupled to memory 914. The one or more adjunct processors are defined in one architecture and are configured to emulate another architecture. For example, an adjunct processor obtains guest commands of the architecture being emulated, translates the guest commands into native commands of the one architecture and executes the native commands.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention. For instance, each may be configured for a hybrid security certificate facility, in accordance with one or more aspects of the present invention.

Although various embodiments are described herein, many variations and other embodiments are possible without departing from a spirit of aspects of the present invention. It should be noted that, unless otherwise inconsistent, each aspect or feature described herein, and variants thereof, may be combinable with any other aspect or feature.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
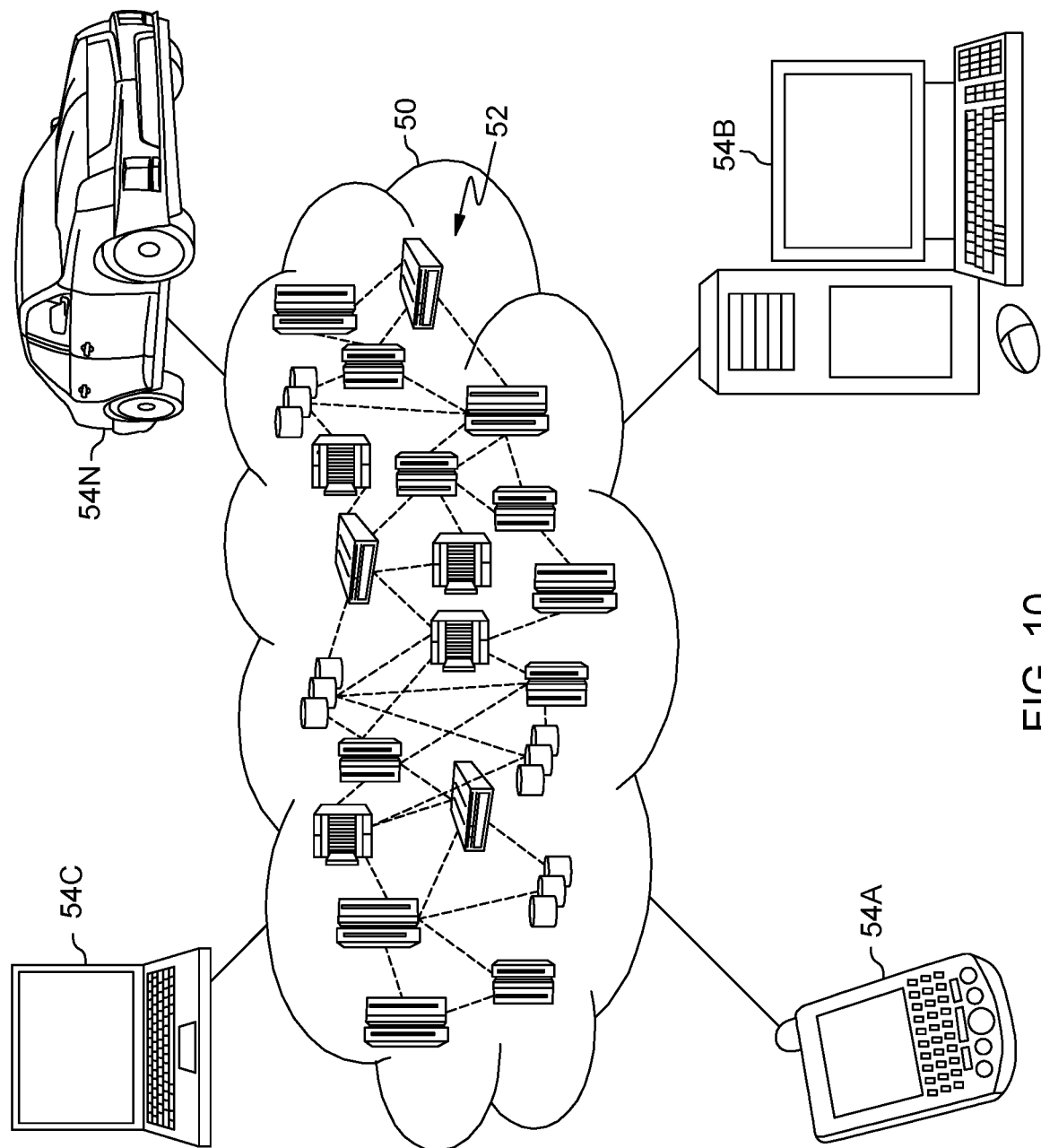
FIG. 10 depicts one embodiment of a cloud computing environment, in accordance with one or more aspects of the present invention.

Referring now to FIG. 10, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 52 and cloud computing environment 50 can communicate with any type of computerized device over any type of network and/or network addressable connection (e.g., using a web browser).

Figure 11:
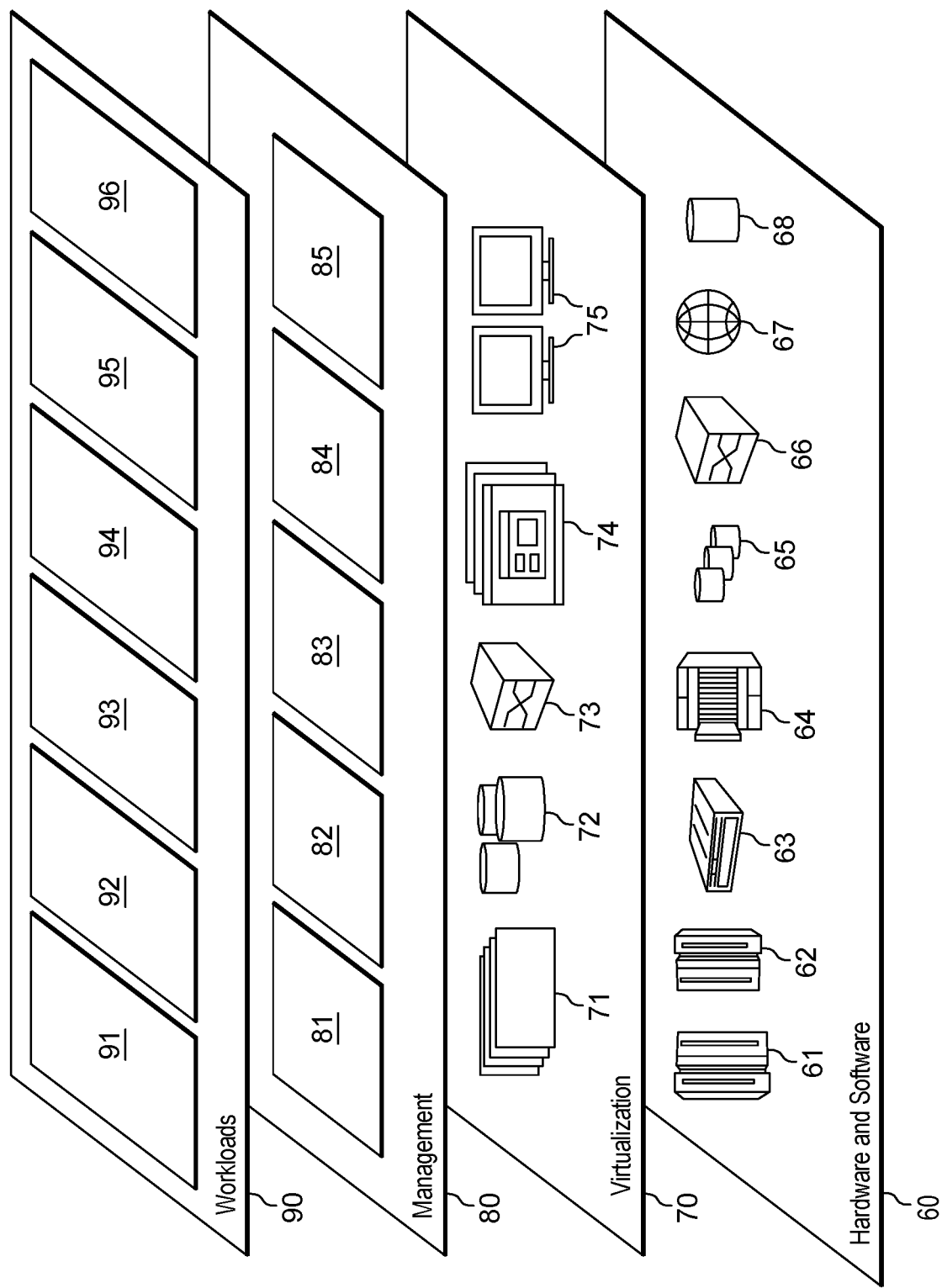
FIG. 11 depicts one example of abstraction model layers, in accordance with one or more aspects of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cryptographic-related processing 96.

Aspects of the present invention can be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, commands or operations may be used. Additionally, different types of indications or tags may be specified. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer system for facilitating cryptographic-related processing within a computing environment, the computer system comprising:
  a memory; and
  a processing circuit in communication with the memory, wherein the computer system is configured to perform a method, the method comprising:
    obtaining, by an n-bit accelerator, multiple input operands packed together as a packed integer, the packed integer being an n-bit integer comprising multiple slots, where input operands of the multiple input operands are packed into every other slot of the multiple slots, with a gap slot being between adjacent input operands of the multiple input operands to avoid corruption between the adjacent input operands, and each slot of the multiple slots has a bitwidth k; and
    performing, by the n-bit accelerator, one or more predefined operations using the packed integer, to transform the packed integer into result data which facilitates cryptographic-related processing, wherein the performing comprises:
      performing, by the n-bit accelerator, an arithmetic operation of the one or more predefined operations, the performing using the input operands packed in the packed integer to obtain an intermediate result integer comprising multiple low-part and high-part result components in different slots of the intermediate result integer; and
      repacking the multiple low-part and high-part result components of the intermediate result integer into a low-part packed integer and a separate high-part packed integer to facilitate obtaining the result data.

2. The computer system of claim 1, wherein the repacking further comprises:
  shuffling and repacking the intermediate result integer to obtain the low-part packed integer and the high-part packed integer, the low-part packed integer being a respective n-bit integer comprising multiple slots, where low-order parts of the intermediate result are packed into every other slot of the multiple slots, with each low-order part being k-bits wide, starting from a least-significant bit of a respective result component of the intermediate result, and the high-part packed integer being a respective n-bit integer comprising multiple slots, where high-order parts of the intermediate result are packed into every other slot of the multiple slots, with each high-order part being k-bits wide, starting from a most-significant bit of the respective result component of the intermediate result.

3. The computer system of claim 2, further comprising:
separately using the low-part packed integer and the high-part packed integer in facilitating obtaining the result data which facilitates the cryptographic-related processing.

4. The computer system of claim 2, further comprising:
performing, by the n-bit accelerator, another arithmetic operation using the high-part packed integer and a predetermined constant u, the predetermined constant u being dependent, in part, on the bitwidth k, where performing the other arithmetic operation generates another intermediate result comprising multiple result components;
shuffling and repacking the other intermediate result to obtain another high-part packed integer, the other high-part packed integer being another n-bit integer comprising multiple slots, where high-order parts of the multiple result components of the other intermediate result are packed into every other slot of the multiple slots; and
using the other high-part packed integer in facilitating obtaining the result data which facilitates the cryptographic-related processing.

5. The computer system of claim 4, wherein the using the other high-part packed integer further comprises:
performing a further arithmetic operation using the other high-part packed integer and a predefined prime value to obtain a further intermediate result comprising multiple result components; and
shuffling and repacking the further intermediate result to obtain a further low-part packed integer, the further low-part packed integer being a further n-bit integer comprising multiple slots, where low-order parts of the multiple result components of the further intermediate result are packed into every other slot of the multiple slots; and
using the further low-part packed integer in facilitating obtaining the result data which facilitates the cryptographic-related processing.

6. The computer system of claim 2, further comprising performing one or more correction operations using, at least in part, the low-part packed integer to obtain the result data.

7. The computer system of claim 1, wherein the packed integer further comprises a null value of bitwidth k in the gap slot of the multiple slots located between two adjacent input operands of the multiple input operands packed into every other slot of the multiple slots.

8. The computer system of claim 1, wherein the result data facilitates lattice-based cryptographic processing, and the n-bit accelerator comprises a modular arithmetic, hardware accelerator unit.

9. The computer system of claim 1, wherein the bitwidth k of the multiple slots comprises one of 16-bits or 32-bits.

10. A computer-implemented method of facilitating cryptographic-related processing within a computing environment, the computer-implemented method comprising:
obtaining, by an n-bit accelerator, multiple input operands packed together as a packed integer, the packed integer being an n-bit integer comprising multiple slots, where input operands of the multiple input operands are packed into every other slot of the multiple slots, with a gap slot being between adjacent input operands of the multiple input operands to avoid corruption between the adjacent input operands, and each slot of the multiple slots has a bitwidth k; and
performing, by the n-bit accelerator, one or more predefined operations using the packed integer, to transform the packed integer into result data which facilitates cryptographic-related processing, wherein the performing comprises:
performing, by the n-bit accelerator, an arithmetic operation of the one or more predefined operations, the performing using the input operands packed in the packed integer to obtain an intermediate result integer comprising multiple low-part and high-part result components in different slots of the intermediate result integer; and
repacking the multiple low-part and high-part result components of the intermediate result integer into a low-part packed integer and a separate high-part packed integer to facilitate obtaining the result data.

11. The computer-implemented method of claim 10, wherein the repacking further comprises:
shuffling and repacking the intermediate result integer to obtain the low-part packed integer and the high-part packed integer, the low-part packed integer being a respective n-bit integer comprising multiple slots, where low-order parts of the intermediate result are packed into every other slot of the multiple slots, with each low-order part being k-bits wide, starting from a least-significant bit of a respective result component of the intermediate result, and the high-part packed integer being a respective n-bit integer comprising multiple slots, where high-order parts of the intermediate result are packed into every other slot of the multiple slots, with each high-order part being k-bits wide, starting from a most-significant bit of the respective result component of the intermediate result; and
separately using the low-part packed integer and the high-part packed integer in facilitating obtaining the result data which facilitates the cryptographic-related processing.

12. The computer-implemented method of claim 11, further comprising:
performing, by the n-bit accelerator, another arithmetic operation using the high-part packed integer and a predetermined constant u, the predetermined constant u being dependent, in part, on the bitwidth k, where performing the other arithmetic operation generates another intermediate result comprising multiple result components;
shuffling and repacking the other intermediate result to obtain another high-part packed integer, the other high-part packed integer being another n-bit integer comprising multiple slots, where high-order parts of the multiple result components of the other intermediate result are packed into every other slot of the multiple slots; and using the other high-part packed integer in facilitating obtaining the result data which facilitates the cryptographic-related processing.

13. The computer-implemented method of claim 12, wherein the using the other high-part packed integer further comprises:
performing a further arithmetic operation using the other high-part packed integer and a predefined prime value to obtain a further intermediate result comprising multiple result components; and
shuffling and repacking the further intermediate result to obtain a further low-part packed integer, the further low-part packed integer being a further n-bit integer comprising multiple slots, where low-order parts of the multiple result components of the further intermediate result are packed into every other slot of the multiple slots; and
using the further low-part packed integer in facilitating obtaining the result data which facilitates the cryptographic-related processing.

14. The computer-implemented method of claim 11, further comprising performing one or more correction operations using, at least in part, the low-part packed integer to obtain the result data.

15. The computer-implemented method of claim 10, wherein the packed integer further comprises a null value of bitwidth k in the gap slot of the multiple slots located between two adjacent input operands of the multiple input operands packed into every other slot of the multiple slots.

16. The computer-implemented method of claim 10, wherein the result data facilitates lattice-based cryptographic processing, and the n-bit accelerator comprises a modular arithmetic, hardware accelerator unit.

17. The computer-implemented method of claim 10, wherein the bitwidth k of the multiple slots comprises one of 16-bits or 32-bits.

18. A computer program product for facilitating cryptographic-related processing within a computing environment, the computer program product comprising:
at least one computer-readable storage medium having program instructions embodied therewith, the program instructions being readable by a processing circuit to cause the processing circuit to perform a method comprising:
obtaining, by an n-bit accelerator, multiple input operands packed together as a packed integer, the packed integer being an n-bit integer comprising multiple slots, where input operands of the multiple input operands are packed into every other slot of the multiple slots, with a gap slot being between adjacent input operands of the multiple input operands to avoid corruption between the adjacent input operands, and each slot of the multiple slots has a bitwidth k; and performing, by the an n-bit accelerator, one or more predefined operations using the packed integer, to transform the packed integer into result data which facilitates cryptographic-related processing, wherein the performing comprises:
performing, by the n-bit accelerator, an arithmetic operation of the one or more predefined operations, the performing using the input operands packed in the packed integer to obtain an intermediate result integer comprising multiple low-part and high-part result components in different slots of the intermediate result integer; and
repacking the multiple low-part and high-part result components of the intermediate result integer into a low-part packed integer and a separate high-part packed integer to facilitate obtaining the result data.

19. The computer program product of claim 18, wherein the repacking further comprises:
shuffling and repacking the intermediate result integer to obtain the low-part packed integer and the high-part packed integer, the low-part packed integer being a respective n-bit integer comprising multiple slots, where low-order parts of the intermediate result are packed into every other slot of the multiple slots, with each low-order part being k-bits wide, starting from a least-significant bit of a respective result component of the intermediate result, and the high-part packed integer being a respective n-bit integer comprising multiple slots, where high-order parts of the intermediate result are packed into every other slot of the multiple slots, with each high-order part being k-bits wide, starting from a most-significant bit of the respective result component of the intermediate result.

20. The computer program product of claim 19, further comprising:
performing, by the n-bit accelerator, another arithmetic operation using the high-part packed integer and a predetermined constant u, the predetermined constant u being dependent, in part, on the bitwidth k, where performing the other arithmetic operation generates another intermediate result comprising multiple result components;
shuffling and repacking the other intermediate result to obtain another high-part packed integer, the other high-part packed integer being another n-bit integer comprising multiple slots, where high-order parts of the multiple result components of the other intermediate result are packed into every other slot of the multiple slots; and
using the other high-part packed integer in facilitating obtaining the result data which facilitates the cryptographic-related processing.

* * * * *